United States Patent
Ang et al.

(10) Patent No.: US 11,290,241 B2
(45) Date of Patent: Mar. 29, 2022

(54) MASTER CELL GROUP AND SECONDARY CELL GROUP COEXISTENCE

(71) Applicant: QUALCOMM Incorporated, San Diego, CA (US)

(72) Inventors: Peter Pui Lok Ang, San Diego, CA (US); Xiao Feng Wang, San Diego, CA (US); Juan Montojo, San Diego, CA (US); Peter Gaal, San Diego, CA (US); Wanshi Chen, San Diego, CA (US); Heechoon Lee, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 407 days.

(21) Appl. No.: 16/360,450

(22) Filed: Mar. 21, 2019

(65) Prior Publication Data
US 2019/0296881 A1 Sep. 26, 2019

Related U.S. Application Data

(60) Provisional application No. 62/674,824, filed on May 22, 2018, provisional application No. 62/647,625, filed on Mar. 23, 2018.

(51) Int. Cl.
*H04W 4/00* (2018.01)
*H04L 5/00* (2006.01)
(Continued)

(52) U.S. Cl.
CPC ......... *H04L 5/0082* (2013.01); *H04L 1/1819* (2013.01); *H04L 5/1469* (2013.01);
(Continued)

(58) Field of Classification Search
None
See application file for complete search history.

(56) References Cited

U.S. PATENT DOCUMENTS

2014/0269452 A1 * 9/2014 Papasakellariou .... H04L 5/0055
370/280
2014/0269454 A1 * 9/2014 Papasakellariou ........ H04L 5/14
370/280
(Continued)

FOREIGN PATENT DOCUMENTS

EP 2943007 A1 * 11/2015 ........ H04W 36/0069
EP 3030000 A1 6/2016
(Continued)

OTHER PUBLICATIONS

Alcatel-Lucent: "Discussion on Throughput Enhancement with User Plane Architecture Option 1A", 3GPP Draft, 3GPP TSG RAN WG2 Meeting #83bis, R2-133525, 3rd Generation Partnership Project (3GPP), Mobile Competence Centre, 650, Route Des Lucioles, F-06921 Sophia-Antipolis Cedex, France, vol. RAN WG2, No. Ljubljana, Slovenia, Oct. 7, 2013-Oct. 11, 2013, Sep. 28, 2013 (Sep. 28, 2013), XP050719237, pp. 1-4, Retrieved from the Internet: URL:http://www.3gpp.org/ftp/tsg_ran/WG2_RL2/TSGR2_83bis/Docs/ [retrieved on Sep. 28, 2013] p. 3, paragraph 1 . . . .
(Continued)

*Primary Examiner* — Zewdu A Beyen
(74) *Attorney, Agent, or Firm* — Holland & Hart LLP

(57) ABSTRACT

Methods, systems, and devices for wireless communications are described. A wireless communications network may set priorities for cell groups in dual connectivity. A higher priority cell group may reserve slots and indicate the reserved slots to the lower priority cell group, for example by a backhaul connection. The high priority cell group may also indicate additional, non-reserved slots, which the lower priority cell group may reserve or use for scheduling. One of
(Continued)

the cell groups may transmit a slot format indication (SFI) to a user equipment (UE) in the dual connectivity to indicate the slot reservations. In some cases, a hybrid automatic repeat request (HARQ) timing parameter may be based on a number of reserved slots. In some cases, power control may be varied based on whether the UE is capable of simultaneous uplink and downlink transmission.

30 Claims, 19 Drawing Sheets

(51) Int. Cl.
| | |
|---|---|
| H04W 76/15 | (2018.01) |
| H04W 72/04 | (2009.01) |
| H04L 5/14 | (2006.01) |
| H04L 1/18 | (2006.01) |
| H04W 52/32 | (2009.01) |
| H04W 76/20 | (2018.01) |
| H04W 84/20 | (2009.01) |

(52) U.S. Cl.
CPC ....... *H04W 52/32* (2013.01); *H04W 72/0446* (2013.01); *H04W 76/15* (2018.02); *H04W 76/20* (2018.02); *H04W 84/20* (2013.01)

(56) References Cited

U.S. PATENT DOCUMENTS

| | | | |
|---|---|---|---|
| 2017/0188314 A1* | 6/2017 | Mueck | H04W 24/02 |
| 2018/0242316 A1* | 8/2018 | Takeda | H04W 72/0446 |
| 2020/0154496 A1* | 5/2020 | Yi | H04W 72/10 |
| 2021/0058872 A1* | 2/2021 | Ryoo | H04W 52/146 |
| 2021/0075567 A1* | 3/2021 | Van Der Velde | H04W 76/40 |

FOREIGN PATENT DOCUMENTS

| | | |
|---|---|---|
| EP | 3383110 A1 | 10/2018 |
| WO | WO-2016175631 A1 | 11/2016 |
| WO | WO-2017110954 A1 | 6/2017 |

OTHER PUBLICATIONS

Catt: "Enhanced Interference Management by Resource Partitioning", 3GPP Draft, 3GPP TSG RAN WG1 Meeting #61bis, R1-103496, 3rd Generation Partnership Project (3GPP), Mobile Competence Centre, 650, Route Des Lucioles, F-06921 Sophia-Antipolis Cedex, France, vol. RAN WG1. No. Dresden, Germany, Jun. 28, 2010, Jun. 22, 2010 (Jun. 22, 2010), XP050449015, 4 Pages, [retrieved on Jun. 22, 2010] p. 1, line 16-line 20, p. 1, line 25-line 31.
International Search Report and Written Opinion—PCT/US2019/023563—ISA/EPO—dated Jun. 27, 2019 (182707WO).

* cited by examiner

| | MCG Reserved Slots 405 |
|---|---|
|  | |
|  | SCG Reserved Slots 410 |
|  | Non-Reserved Slots 415 |

400

| Configuration 505 | MCG 510 | | | SCG 515 | | |
|---|---|---|---|---|---|---|
| 1 | TDD | NR DL | NR UL | FDD | LTE DL | |
|   |     |       |       |     | LTE UL | |
| 2 | FDD | NR DL | | FDD | LTE DL | |
|   |     | NR UL | |     | LTE UL | |
| 3 | TDD | NR DL | NR UL | FDD + SUL | LTE DL | |
|   |     |       |       |           | LTE UL | NR UL |
| 4 | TDD | NR DL | NR UL | TDD | LTE DL | LTE UL |

500

MASTER CELL GROUP AND SECONDARY CELL GROUP COEXISTENCE

CROSS REFERENCES

The present Application for Patent claims priority to U.S. Provisional Patent Application No. 62/674,824 by Ang et al., entitled "Master Cell Group And Secondary Cell Group Coexistence," filed May 22, 2018, and U.S. Provisional Patent Application No. 62/647,625 by Ang et al., entitled "Master Cell Group And Secondary Cell Group Coexistence," filed Mar. 23, 2018, assigned to the assignee hereof.

BACKGROUND

The following relates generally to wireless communications and more specifically to master cell group (MCG) and secondary cell group (SCG) coexistence.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A wireless communications system may implement a dual connectivity scheme, where a UE may simultaneously be connected to a first base station for LTE communications and to a second base station for NR communications. In dual connectivity, one of the base stations may be identified as a MCG. This base station (e.g., the MCG) may provide an anchor carrier for communications with the UE. The anchor carrier may be associated with a same radio access technology (RAT) as that of the MCG. The base station that is not an MCG in a dual connectivity scheme may be identified as a SCG. In some examples, the MCG is associated with LTE and controls an SCG associated with NR. In other examples, the MCG may be associated with NR, while the SCG is associated with LTE. Dual connectivity schemes with an NR anchor may provide improved throughput for a UE. However, in either case, whether the MCG is associated with NR or LTE, while the SCG is associated with a different RAT (LTE or NR, respectively), coexistence issues may arise.

SUMMARY

A wireless communications system may implement dual connectivity schemes to improve throughput for wireless devices. For example, a user equipment (UE) may simultaneously be connected to a first base station (e.g., an evolved Node B (eNB)) for LTE communications and to a second base station (e.g., a next generation Node B (gNB)) for New Radio (NR) communications. One of the base stations may provide a master cell group (MCG) which controls a secondary cell group (SCG). The core network may implement a priority scheme for the radio access technologies (RATs) based on whether NR or LTE has higher priority. A higher priority cell group may reserve slots across cells in the dual connectivity scheme and indicate the reserved slots to the lower priority cell group (e.g., via a backhaul connection). The higher priority cell group may also indicate additional, non-reserved slots, which the lower priority cell group may reserve or use for scheduling. The higher priority cell group may also independently schedule transmissions on the non-reserved, additional slots. A cell group may transmit a slot format indication (SFI) to the UE to indicate the slot reservations. In some examples, the wireless communications system may utilize a hybrid automatic repeat request (HARQ) timing offset indication based on a number of reserved slots instead of total slots.

In some cases, the UE may be capable of dual-uplink transmission on an NR carrier and an LTE carrier during non-reserved slots. If the UE is capable of dynamic power control, the core network may set priorities for uplink channels of the MCG and the SCG. For example, MCG uplink control channels may have a higher priority than the SCG uplink control channels, or MCG uplink data channels may have the same priority as SCG uplink data channels, or any MCG uplink channel may have a higher priority than the corresponding SCG uplink channel, among other configurations. The UE may be configured to drop or scale down the transmit power of a channel based on a priority of the channel and a transmission starting time of the channel. In some other examples, slots reserved for LTE and slots reserved for NR may have different power configurations. For example, reserved slots which are exclusive may have a larger transmission power limit. Non-reserved slots may have smaller transmission power limits. The UE may follow maximum power levels configured for the MCG and the SCG independently.

A method of wireless communication at a UE is described. The method may include identifying that the UE is operating in dual connectivity with a master cell group and a secondary cell group, receiving, from the master cell group, an indication of reserved transmission time intervals (TTIs) that are reserved for priority uplink (UL) communication with the master cell group, identifying additional TTIs that are available for UL communication with either the master cell group or the secondary cell group, transmitting one or more UL messages to the master cell group using the reserved TTIs, and transmitting one or more UL messages to either the master cell group or the secondary cell group using the additional TTIs.

An apparatus for wireless communication at a UE is described. The apparatus may include a processor, memory in electronic communication with the processor, and instructions stored in the memory. The instructions may be executable by the processor to cause the apparatus to identifying that the UE is operating in dual connectivity with a master cell group and a secondary cell group, receiving, from the master cell group, an indication of reserved TTIs that are reserved for priority UL communication with the master cell group, identifying additional TTIs that are available for UL communication with either the master cell group or the secondary cell group, transmitting one or more UL messages to the master cell group using the reserved TTIs, and transmitting one or more UL messages to either the master cell group or the secondary cell group using the additional TTIs.

Another apparatus for wireless communication at a UE is described. The apparatus may include identifying that the UE is operating in dual connectivity with a master cell group and a secondary cell group, receiving, from the master cell group, an indication of reserved TTIs that are reserved for priority UL communication with the master cell group, identifying additional TTIs that are available for UL communication with either the master cell group or the secondary cell group, transmitting one or more UL messages to the master cell group using the reserved TTIs, and transmitting one or more UL messages to either the master cell group or the secondary cell group using the additional TTIs.

A non-transitory computer-readable medium storing code for wireless communication at a UE is described. The code may include instructions executable by a processor to identifying that the UE is operating in dual connectivity with a master cell group and a secondary cell group, receiving, from the master cell group, an indication of reserved TTIs that are reserved for priority UL communication with the master cell group, identifying additional TTIs that are available for UL communication with either the master cell group or the secondary cell group, transmitting one or more UL messages to the master cell group using the reserved TTIs, and transmitting one or more UL messages to either the master cell group or the secondary cell group using the additional TTIs.

Some examples of the method, apparatuses, and non-transitory computer-readable medium described herein may further include operations, features, means, or instructions for receiving, from the secondary cell group, an indication of additionally reserved TTIs that may be reserved for UL communication with the secondary cell group, where the reserved TTIs and the additionally reserved TTIs may be disjoint in time and transmitting one or more UL messages to the secondary cell group using the additionally reserved TTIs. Some examples of the method, apparatuses, and non-transitory computer-readable medium described herein may further include operations, features, means, or instructions for receiving a schedule for using one or more of the additional TTIs for UL communication with either the master cell group or the secondary cell group, the schedule facilitating avoidance of simultaneous UL transmissions to both the master cell group and the secondary cell group, where transmitting the one or more UL messages using the additional TTIs may be in accordance with the schedule.

Some examples of the method, apparatuses, and non-transitory computer-readable medium described herein may further include operations, features, means, or instructions for determining that an UL message to the master cell group and an UL message to the secondary cell group may be both scheduled for a same TTI of the additional TTIs, identifying a priority between the UL message to the master cell group and the UL message to the secondary cell group and transmitting one of the UL message to the master cell group or the UL message to the secondary cell group during the TTI based on the priority. In some examples of the method, apparatuses, and non-transitory computer-readable medium described herein, receiving the indication of reserved TTIs may include operations, features, means, or instructions for receiving a slot format indication (SFI) that identifies a configuration for UL TTIs, downlink (DL) TTIs, unknown TTIs, or combinations of the same, where the reserved TTIs include the UL TTIs.

In some examples of the method, apparatuses, and non-transitory computer-readable medium described herein, receiving the SFI may include operations, features, means, or instructions for receiving a cell-specific configured SFI.

In some examples of the method, apparatuses, and non-transitory computer-readable medium described herein, receiving the SFI may include operations, features, means, or instructions for receiving a UE-specific configured SFI, where the UE-specific configured SFI overrides any received cell-specific configured SFI. In some examples of the method, apparatuses, and non-transitory computer-readable medium described herein, receiving the SFI may include operations, features, means, or instructions for receiving a dynamic SFI via DCI, where the dynamic SFI may be specific for an upcoming TTI or set of TTIs.

In some examples of the method, apparatuses, and non-transitory computer-readable medium described herein, the indication further indicates DL TTIs, unknown TTIs, or both which may be reserved for communication with the master cell group. In some examples of the method, apparatuses, and non-transitory computer-readable medium described herein, the master cell group may be configured for time-division duplex (TDD) operation and the secondary cell group may be configured for frequency-division duplex (FDD) operation. Some examples of the method, apparatuses, and non-transitory computer-readable medium described herein may further include operations, features, means, or instructions for both the master cell group and the secondary cell group may be configured for FDD operation. In some examples of the method, apparatuses, and non-transitory computer-readable medium described herein, the master cell group may be configured for TDD operation and the secondary cell group may be configured for FDD operation, with UL transmissions to the secondary cell group being time-shared with supplemental uplink (SUL) transmissions to the master cell group.

Some examples of the method, apparatuses, and non-transitory computer-readable medium described herein may further include operations, features, means, or instructions for both the master cell group and the secondary cell group may be configured for TDD operation. Some examples of the method, apparatuses, and non-transitory computer-readable medium described herein may further include operations, features, means, or instructions for identifying an FDD timing configuration for UL transmissions to the secondary cell group, the FDD timing configuration facilitating avoidance of simultaneous UL transmissions to both the master cell group and the secondary cell group, where transmitting the one or more UL messages using the additional TTIs may be in accordance with the FDD timing configuration.

In some examples of the method, apparatuses, and non-transitory computer-readable medium described herein, the one or more UL messages transmitted using the additional TTIs include LTE physical random access channel (PRACH) message, sounding reference signal (SRS) messages, HARQ messages, or a combination of the same. Some examples of the method, apparatuses, and non-transitory computer-readable medium described herein may further include operations, features, means, or instructions for receiving a joint configuration that includes the indication of reserved TTIs that may be reserved for UL or DL communications with the master cell group, as well as an indication of which of the additional TTIs may be to be used for UL or DL communications with the master cell group and which of the additional TTIs may be to be used for UL or DL communications with the secondary cell group.

Some examples of the method, apparatuses, and non-transitory computer-readable medium described herein may further include operations, features, means, or instructions for receiving a prioritized configuration that includes the indication of reserved TTIs that may be reserved for UL or DL communications with the master cell group, as well as an indication of which of the additional TTIs may be to be used for UL or DL communications with the master cell group. In some examples of the method, apparatuses, and non-transitory computer-readable medium described herein, transmitting the one or more UL messages to either the master cell group or the secondary cell group using the additional TTIs may include operations, features, means, or instructions for transmitting the one or more UL messages to the secondary cell group during one of the additional TTIs indicated as being for DL communications with the master cell group.

Some examples of the method, apparatuses, and non-transitory computer-readable medium described herein may further include operations, features, means, or instructions for identifying a parameter that indicates a time offset for UL transmission of HARQ feedback after receipt of a data message, where the time offset may be in terms of a number of reserved TTIs and transmitting HARQ feedback in accordance with the parameter. In some examples of the method, apparatuses, and non-transitory computer-readable medium described herein, transmitting the one or more UL messages to either the master cell group or the secondary cell group using the additional TTIs may include operations, features, means, or instructions for transmitting UL messages to the master cell group and to the secondary cell group during different TTIs. In some examples of the method, apparatuses, and non-transitory computer-readable medium described herein, transmitting the one or more UL messages to either the master cell group or the secondary cell group using the additional TTIs may include operations, features, means, or instructions for transmitting UL messages to the master cell group and to the secondary cell group during a same TTI.

Some examples of the method, apparatuses, and non-transitory computer-readable medium described herein may further include operations, features, means, or instructions for prioritizing power control for each of the UL messages transmitted during the same TTI based on a type of the UL messages. Some examples of the method, apparatuses, and non-transitory computer-readable medium described herein may further include operations, features, means, or instructions for prioritizing power control for each of the UL messages transmitted during the same TTI based on a start time for each of the UL messages. In some examples of the method, apparatuses, and non-transitory computer-readable medium described herein, a maximum power control for the UL messages transmitted to the master cell group and a maximum power control for the UL messages transmitted to the secondary cell group during the same TTI may be each less than respective power controls for UL transmissions during different TTIs.

Some examples of the method, apparatuses, and non-transitory computer-readable medium described herein may further include operations, features, means, or instructions for identifying a first TTI duration associated with the master cell group, identifying a second TTI duration associated with the secondary cell group, and applying a transmission power control scheme based at least in part on the first TTI duration and the second TTI duration. In some examples of the method, apparatuses, and non-transitory computer-readable medium described herein, applying the transmission power control scheme further includes adjusting a transmission power for the UL messages transmitted to the master cell group and the UL messages transmitted to the secondary cell group after a TTI of the first TTI duration based at least in part on the first TTI duration being longer than the second TTI duration. In some examples of the method, apparatuses, and non-transitory computer-readable medium described herein, applying the transmission power control scheme further includes adjusting a transmission power for the UL messages transmitted to the master cell group and the UL messages transmitted to the secondary cell group after a TTI of the second TTI duration based at least in part on the second TTI duration being longer than the first TTI duration.

A method of wireless communication at a base station is described. The method may include identifying that the base station is operating as a master cell group in dual connectivity with a UE, transmitting, to the UE, an indication of reserved TTIs that are reserved for priority UL communication with the master cell group, indicating to a secondary cell group the reserved TTIs and also additional TTIs that are available for UL communication with either the master cell group or the secondary cell group, and receiving, from the UE, one or more UL messages using the reserved TTIs.

An apparatus for wireless communication at a base station is described. The apparatus may include a processor, memory in electronic communication with the processor, and instructions stored in the memory. The instructions may be executable by the processor to cause the apparatus to identifying that the base station is operating as a master cell group in dual connectivity with a UE, transmitting, to the UE, an indication of reserved TTIs that are reserved for priority UL communication with the master cell group, indicating to a secondary cell group the reserved TTIs and also additional TTIs that are available for UL communication with either the master cell group or the secondary cell group, and receiving, from the UE, one or more UL messages using the reserved TTIs.

Another apparatus for wireless communication at a base station is described. The apparatus may include identifying that the base station is operating as a master cell group in dual connectivity with a UE, transmitting, to the UE, an indication of reserved TTIs that are reserved for priority UL communication with the master cell group, indicating to a secondary cell group the reserved TTIs and also additional TTIs that are available for UL communication with either the master cell group or the secondary cell group, and receiving, from the UE, one or more UL messages using the reserved TTIs.

A non-transitory computer-readable medium storing code for wireless communication at a base station is described. The code may include instructions executable by a processor to identifying that the base station is operating as a master cell group in dual connectivity with a UE, transmitting, to the UE, an indication of reserved TTIs that are reserved for priority UL communication with the master cell group, indicating to a secondary cell group the reserved TTIs and also additional TTIs that are available for UL communication with either the master cell group or the secondary cell group, and receiving, from the UE, one or more UL messages using the reserved TTIs.

Some examples of the method, apparatuses, and non-transitory computer-readable medium described herein may further include operations, features, means, or instructions for transmitting a schedule for using one or more of the additional TTIs for UL communication with either the master cell group or the secondary cell group, the schedule facilitating avoidance of simultaneous UL transmissions to both the master cell group and the secondary cell group. In some examples of the method, apparatuses, and non-transitory computer-readable medium described herein, transmitting the indication of reserved TTIs may include operations, features, means, or instructions for transmitting a SFI that identifies a configuration for UL TTIs, DL TTIs, unknown TTIs, or combinations of the same, where the reserved TTIs include the UL TTIs. In some examples of the method, apparatuses, and non-transitory computer-readable medium described herein, transmitting the SFI may include operations, features, means, or instructions for transmitting a cell-specific configured SFI.

In some examples of the method, apparatuses, and non-transitory computer-readable medium described herein, transmitting the SFI may include operations, features, means, or instructions for transmitting a UE-specific configured SFI, where the UE-specific configured SFI overrides any previously transmitted cell-specific configured SFI. In some examples of the method, apparatuses, and non-transitory computer-readable medium described herein, transmitting the SFI may include operations, features, means, or instructions for transmitting a dynamic SFI via DCI, where the dynamic SFI may be specific for an upcoming TTI or set of TTIs. In some examples of the method, apparatuses, and non-transitory computer-readable medium described herein, the indication further indicates DL TTIs, unknown TTIs, or both which may be reserved for communication with the master cell group. In some examples of the method, apparatuses, and non-transitory computer-readable medium described herein, the master cell group may be configured for TDD operation and the secondary cell group may be configured for FDD operation.

Some examples of the method, apparatuses, and non-transitory computer-readable medium described herein may further include operations, features, means, or instructions for both the master cell group and the secondary cell group may be configured for FDD operation. In some examples of the method, apparatuses, and non-transitory computer-readable medium described herein, the master cell group may be configured for TDD operation and the secondary cell group may be configured for FDD operation, with UL transmissions to the secondary cell group being time-shared with SUL transmissions to the master cell group. Some examples of the method, apparatuses, and non-transitory computer-readable medium described herein may further include operations, features, means, or instructions for both the master cell group and the secondary cell group may be configured for TDD operation.

Some examples of the method, apparatuses, and non-transitory computer-readable medium described herein may further include operations, features, means, or instructions for indicating, to the UE, an FDD timing configuration for UL transmissions to the secondary cell group, the FDD timing configuration facilitating avoidance of simultaneous UL transmissions to both the master cell group and the secondary cell group. Some examples of the method, apparatuses, and non-transitory computer-readable medium described herein may further include operations, features, means, or instructions for transmitting, to the UE, a joint configuration that includes the indication of reserved TTIs that may be reserved for UL or DL communications with the master cell group, as well as an indication of which of the additional TTIs may be to be used for UL or DL communications with the master cell group and which of the additional TTIs may be to be used for UL or DL communications with the secondary cell group.

Some examples of the method, apparatuses, and non-transitory computer-readable medium described herein may further include operations, features, means, or instructions for transmitting, to the UE, a prioritized configuration that includes the indication of reserved TTIs that may be reserved for UL or DL communications with the master cell group, as well as an indication of which of the additional TTIs may be to be used for UL or DL communications with the master cell group. Some examples of the method, apparatuses, and non-transitory computer-readable medium described herein may further include operations, features, means, or instructions for transmitting, to the UE, a parameter that indicates a time offset for UL transmission of HARQ feedback after receipt of a data message, where the time offset may be in terms of a number of reserved TTIs and receiving HARQ feedback in accordance with the parameter.

DETAILED DESCRIPTION

Figure 1:
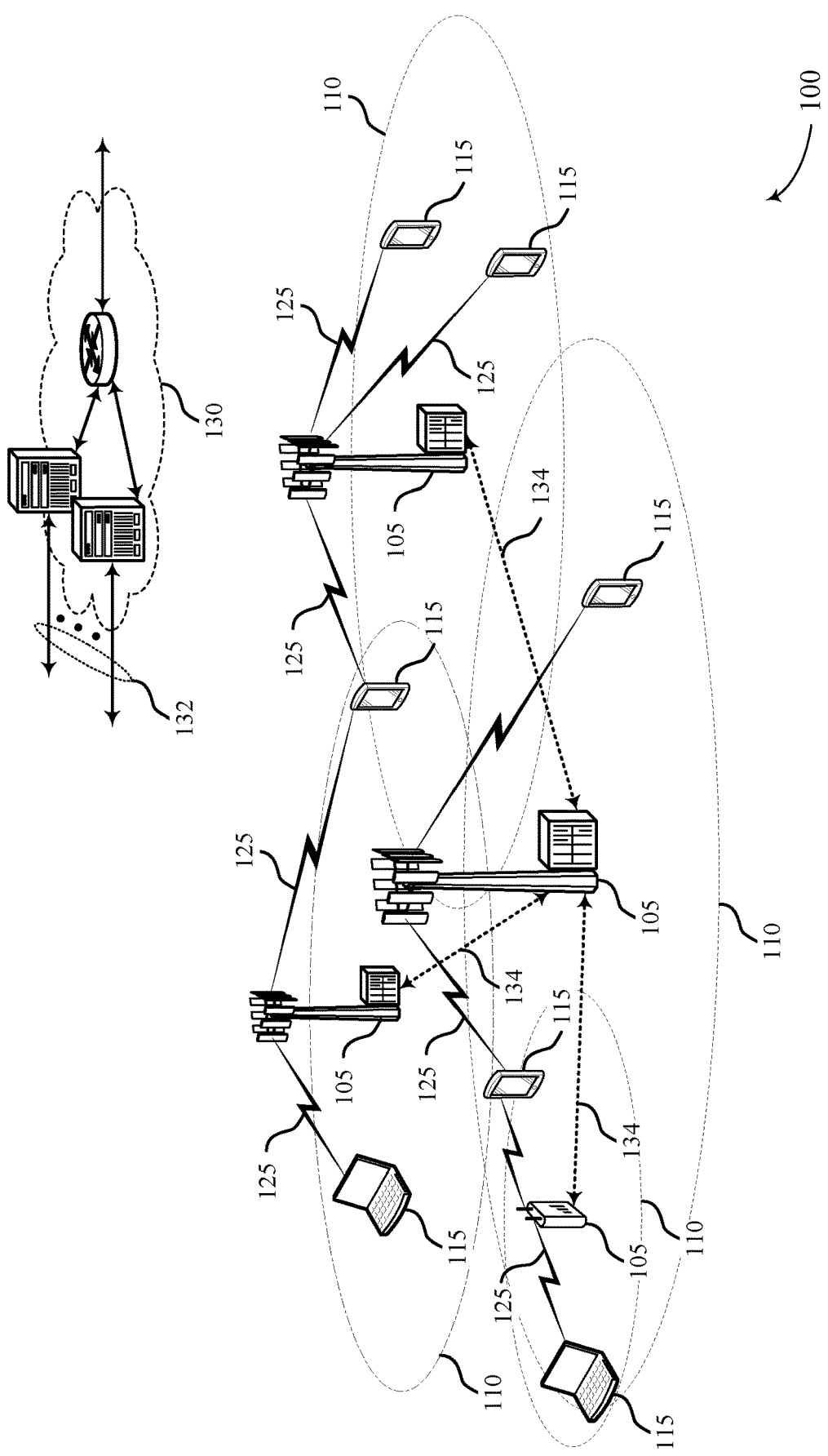
FIG. 1 illustrates an example of a wireless communications system that supports master cell group (MCG) and secondary cell group (SCG) coexistence in accordance with aspects of the present disclosure.

A wireless communications system may implement dual connectivity schemes to improve throughput for wireless devices. For example, a user equipment (UE) may simultaneously be connected to a first base station (e.g., an evolved Node B (eNB)) for LTE communications and to a second base station (e.g., a next generation Node B (gNB)) for NR communications. One of the base stations may provide a master cell group (MCG) which controls a secondary cell group (SCG). The MCG includes an anchor carrier associated with the same radio access technology (RAT) as the MCG.

The wireless communications system may also implement various configurations for a dual connectivity scheme. In many wireless communications systems, the dual connectivity scheme includes an LTE anchor, where an eNB is the MCG which connects the UE to the core network. Thus, the SCG may be an NR node which connects the UE to the core network, either directly in an SCG bearer configuration or via a backhaul link with the MCG in a split bearer configuration. Dual connectivity schemes may also use an NR anchor, which may provide improved throughput for a UE. Thus, in some scenarios, an NR node or gNB may be the MCG while an eNB may be the SCG. In either case, coexistence issues may arise between the NR and LTE communications.

For example, in a dual connectivity scheme, a UE may be restricted to using uplink carriers associated with one RAT at a time. If the UE is connected to an NR network in a dual connectivity scheme with an NR anchor, the UE may either transmit uplink information to the MCG on an NR carrier or to the SCG on an LTE carrier. In some cases, the UE may transmit on multiple carriers of a RAT for carrier aggregation. Further, scheduling for the NR and LTE transmissions may be affected. A wireless communications system described herein may implement techniques to improve NR and LTE coexistence.

To reduce LTE and NR scheduling conflicts, the serving cells may implement a priority scheme for the RATs. The core network may identify whether NR or LTE has higher priority. The UE may be assigned resources for the higher priority RAT first, the resources being reserved across cells in the dual connectivity scheme. In some cases, NR may be identified as the higher priority RAT based on being associated with the MCG, or due to a higher potential throughput for NR. In some other examples, LTE may be identified as the higher priority RAT based on scheduling flexibility of NR, and the relative scheduling rigidity of LTE. In some cases, a RAT may be identified as the higher priority RAT based on higher reliability, for example if the deployment for the RAT is in a lower frequency band.

The cell groups in the dual connectivity scheme may implement techniques to coordinate NR and LTE scheduling based on priority. The higher priority cell group may reserve sets of transmission time intervals (TTIs) (e.g., slots or subframes) and indicate the reserved TTIs to the lower priority cell group (e.g., via a backhaul connection). The lower priority cell group may schedule remaining TTIs as long as the lower priority cell group's reservations do not interfere with the higher priority reservations. For example, if LTE is higher priority, a slot for NR transmission may not be scheduled to overlap with an uplink subframe reserved for LTE. Similarly, if NR is higher priority, LTE transmissions may not be scheduled during a subframe overlapping with an uplink slot reserved for NR. A cell group may reserve a TTI to transmit or receive a high importance signal, such as hybrid automatic repeat request (HARQ) feedback or physical uplink control channel (PUCCH) messages. LTE and NR deployment may be based on different subcarrier spacing, the slot duration for NR may be a fraction of the subframe duration. In this case, if a TTI is reserved for a particular RAT, the slots or subframes corresponding to the TTI cannot be used by another RAT.

The cell groups may reserve slots for frequency-division duplex (FDD) carriers as well as time-division duplex (TDD) carriers. In some examples, an uplink or downlink carrier for a UE may be configured for FDD transmission, but the serving cells may schedule the UE based on characteristics of a TDD configuration to reduce complexity of reserving slots and scheduling resources.

In some examples, the wireless communications system may utilize a HARQ timing offset indication based on a number of reserved slots instead of total slots. For example, a UE may receive a downlink transmission in a first reserved slot and transmit HARQ feedback for the downlink slots in a fourth reserved slot. If the second and third slots are not reserved, the UE may indicate the timing offset K1=1, and the HARQ feedback may be provided in the following reserved slot. In other configurations, the HARQ timing offset indication may indicate the total number of slots between the data transmission and the HARQ feedback, which may include non-reserved slots. The MCG may indicate how to interpret the HARQ timing offset indicator via Radio Resource Control (RRC) signaling.

In some cases, the UE may be capable of dual-uplink transmission on an NR carrier and an LTE carrier during non-reserved slots. If the UE is capable of dynamic power control, the core network may set priorities for uplink channels of the MCG and the SCG. For example, the MCG PUCCH may have a higher priority than the SCG PUCCH, or the MCG PUSCH may have the same priority as the SCG PUSCH, or any MCG uplink channel may have a higher priority than the corresponding SCG uplink channel, among other configurations. If an aggregated transmit power exceeds the maximum transmit power and the uplink channels start at the same time, the UE may drop or scale down the transmission power of the lower priority channels. If the aggregated transmit power exceeds the maximum power limit and the uplink channels start at different times, the UE may drop or scale down the transmit power of lower priority channels or scale power down or drop the uplink channels which start later.

In some cases, slots reserved for LTE and slots reserved for NR may have different power configurations. For reserved slots which are exclusive (e.g., no other transmission allowed like a single uplink transmission restriction), a larger transmission power limit may be configured for each RAT individually, e.g., for LTE and NR transmissions. For non-reserved slots, smaller transmission power limits may be configured. The UE may follow power limits configured for the MCG and the SCG independently.

Aspects of the disclosure are initially described in the context of a wireless communications system. Aspects of the disclosure are further illustrated by and described with reference to apparatus diagrams, system diagrams, and flowcharts that relate to MCG and SCG coexistence.

FIG. 1 illustrates an example of a wireless communications system 100 that supports MCG and SCG coexistence in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The core network may implement a priority scheme for the RATs and select whether NR or LTE has higher priority. A higher priority cell group may reserve slots across cells in the dual connectivity scheme and indicate the reserved slots to the lower priority cell group, for example by a backhaul connection. The higher priority cell group may also indicate additional, non-reserved slots, which the lower priority cell group may reserve or use for scheduling. The higher priority cell group may also independently schedule transmissions on the non-reserved, additional slots.

A cell group in the dual connectivity may transmit an SFI to the UE 115 to indicate the slot reservations. The SFI may indicate whether a slot is downlink, uplink, or unknown. The SFI may indicate a direction of a configurable number of slots, for example one or more subframes. In some cases, if a slot is indicated as unknown, that slot may be scheduled by the SCG or the MCG. The SFI may be a cell-specific SFI or a UE-specific SFI. A UE-specific SFI may override a slot format indicated by a cell-specific SFI.

Figure 2:
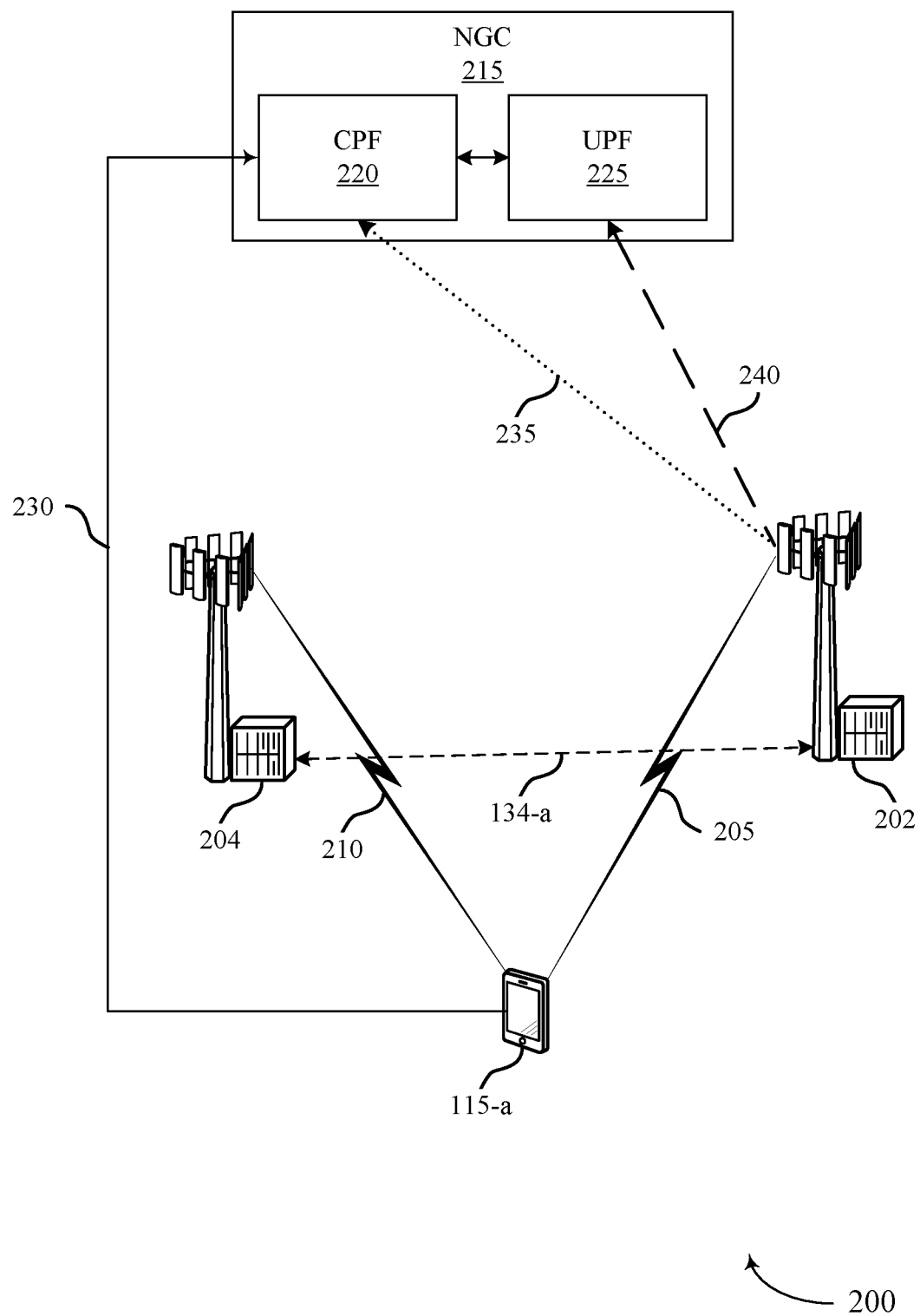
FIG. 2 illustrates an example of a wireless communications system that supports MCG and SCG coexistence in accordance with aspects of the present disclosure.

FIG. 2 illustrates an example of a wireless communications system 200 that supports MCG and SCG coexistence in accordance with aspects of the present disclosure. In some examples, wireless communications system 200 may implement aspects of wireless communications system 100.

Wireless communications system 200 may implement a dual connectivity scheme to improve throughput for UE 115-a. For example, UE 115-a may simultaneously be connected to a gNB 202 for NR communications via an NR link 205 and to an eNB 204 for LTE communications via an LTE link 210. The gNB 202 and the eNB 204 may each be an example of a base station 105. The gNB 202 may control an SCG provided by the eNB 204. The gNB 202 may provide an anchor carrier associated with the same RAT as the MCG.

Wireless communications system 200 may implement a split bearer dual connectivity scheme. UE 115-a may connect to a control plane function (CPF) 220 of a next generation core network (NGC) 215 via an NG1 connection 230. The gNB 202 may connect with the CPF 220 and a user plane function (UPF) 225 of the NGC 215 via an NG2 connection 235 and an NG3 connection 240, respectively. In the split bearer configuration, the eNB 204 may communicate with the NGC 215 through the gNB 202, the two cell groups exchanging information over backhaul link 134-a.

In some cases, UE 115-a may be restricted to using uplink carriers associated with one RAT of a dual connectivity scheme at a time. For example, UE 115-a may either transmit uplink information to the gNB 202 on an uplink carrier of the NR link 205 or to the eNB 204 on an uplink carrier of the LTE link 210. In some cases, UE 115-a may transmit on multiple carriers of a RAT for carrier aggregation. For example, the NR link 205 may include multiple uplink carriers, and UE 115-a may transmit on the multiple NR uplink carriers according to a carrier aggregation configuration. The wireless communications system 200 may implement techniques to improve NR and LTE coexistence when using an NR anchor carrier in a dual connectivity scheme.

The NGC 215 and the serving cells may assign a priority to LTE and NR. For example, the NGC 215 may select NR as the higher priority RAT, or the NGC 215 may select LTE as the higher priority RAT. In some cases, NR may be selected as the higher priority RAT based on being associated with the MCG or based on a higher potential throughput for NR communications. In some other examples, LTE may be selected as the higher priority RAT based on scheduling flexibility of NR, and the relative scheduling rigidity of LTE.

The gNB 202 and the eNB 204 may coordinate NR and LTE scheduling based on the priority scheme. The cell group corresponding to the higher priority RAT may reserve sets of uplink slots, downlink slots, or both uplink and downlink slots. The higher priority cell group may indicate the reserved slots to the lower priority cell group (e.g., via backhaul links 134-a). The lower priority cell group and the higher priority cell group may independently schedule resources for the remaining slots. In some examples, an uplink or downlink carrier for UE 115-a may be configured for FDD transmission, but the serving cells may implement techniques to schedule UE 115-a as though it were a TDD carrier, which is further described in FIG. 5. In some cases, the lower priority cell group may also reserve slots after the higher priority cell group reserves slots as described in FIG. 4.

In some cases, NR may support multiple subcarrier spacing configurations, such that some NR slot durations may be a fraction of a subframe in LTE. If an NR slot is reserved, a subframe which overlaps the reserved slot may not be used for LTE. Similarly, if a subframe is reserved for LTE, the slots that overlap with the reserved subframe may not be used by NR.

A cell group may reserve slots and transmit an SFI to UE 115-a to indicate the reserved slots. The SFI may indicate whether a slot is downlink, uplink, or unknown. The SFI indicating the slot as downlink or uplink may serve as reserving the slot. In some cases, if a slot is indicated as unknown, that slot may be available for scheduling by the MCG or the SCG. In some cases, an unused slot may be available for reservation by the low priority cell group if the low priority cell group's reservation would not interfere with the high priority reservation. The SFI may be applicable for FDD carriers as well as TDD carriers. In some cases, only slots of a certain type can be reserved. For example, there may be configurations where only uplink slots can be reserved. Thus, an indication of an uplink slot in an SFI may indicate that the corresponding slot is reserved, but an indication of a downlink slot may not indicate that the downlink slot is reserved.

In some cases, the SFI may be a cell-specific SFI. The slot format indicated in the cell-specific SFI may be applicable for any UE 115 which receives the cell-specific SFI. In another example, a cell group may transmit a UE-specific SFI. The UE-specific SFI may override a slot format indicated by a cell-specific SFI. In some cases, the MCG may transmit a dynamic SFI indicating the reserved slots. For example, a slot may be indicated as either uplink or downlink by a cell-specific SFI, but the MCG may transmit downlink control information with a dynamic SFI to reserve the slot after the cell-specific SFI.

Non-reserved slots may be scheduled by either the MCG or the SCG. Allocation of the non-reserved slots to a RAT may be determined based on the priorities of the MCG and the SCG, a dynamic SFI, or scheduling. In the dual connectivity scheme, NR and LTE scheduling may be independent. Therefore, the eNB 204 or the gNB 202 may independently schedule UE 115-a for one of the non-reserved slots in a downlink assignment or with an uplink grant. The lower priority cell group may assign resources avoiding the reserved slots of the higher priority cell group.

In some cases, the lower priority cell group may drop assigned slots at the request of the higher priority cell group. For example, a slot may be pre-scheduled for a HARQ-ACK of the lower priority cell group, but shortly before the slot, the higher priority cell group requests to use the slot for uplink transmission. The lower priority cell group may drop the HARQ-ACK transmission for the higher priority cell group to use the resource. In some cases, the NR and LTE cell groups may jointly determine resource allocation.

As an example, NR may be prioritized in wireless communications system 200. The gNB 202 may transmit a cell-specific SFI to UE 115-a indicating reserved uplink slots and downlink slots. The SFI may also indicate some unknown slots. The gNB 202 may reserve a downlink slot for a downlink data transmission and an uplink slot for HARQ feedback for the data transmission. The eNB 204 and the gNB 202 may independently schedule the remaining, non-reserved slots (e.g., including the unknown slots indicated in the SFI) for LTE communications and NR communications respectively.

In some cases, UE 115-a may be capable of dual-uplink transmission on an NR carrier and an LTE carrier during non-reserved slots. If UE 115-a is capable of dynamic power control, the NGC 215 may set priorities for uplink channels of the MCG and the SCG. For example, the MCG PUCCH may have a higher priority than the SCG PUCCH, or the MCG PUSCH may have the same priority as the SCG PUSCH, or any MCG uplink channel may have a higher priority than the corresponding SCG uplink channel, among other configurations. If an aggregated transmit power exceeds the maximum transmit power and the uplink channels start at the same time, UE 115-a may drop or scale down the transmission power of the lower priority channels. If the aggregated transmit power exceeds the maximum power limit and the uplink channels start at different times, UE 115-a may drop or scale down the transmit power of lower priority channels or scale power down or drop the uplink channels which start later.

In some cases, slots reserved for LTE and slots reserved for NR may have different power configurations. For reserved slots which are exclusive (e.g., no other transmission allowed), a larger transmission power limit may be configured for the LTE and NR transmissions. For non-reserved slots, smaller transmission power limits may be configured. UE 115-a may follow maximum power levels configured for the MCG and the SCG independently.

Though the above descriptions describe a dual connectivity scheme where the gNB 202 provides an NR anchor carrier, described techniques are also applicable for cases where an eNB 204 is the MCG and provides an LTE anchor carrier.

Figure 3:
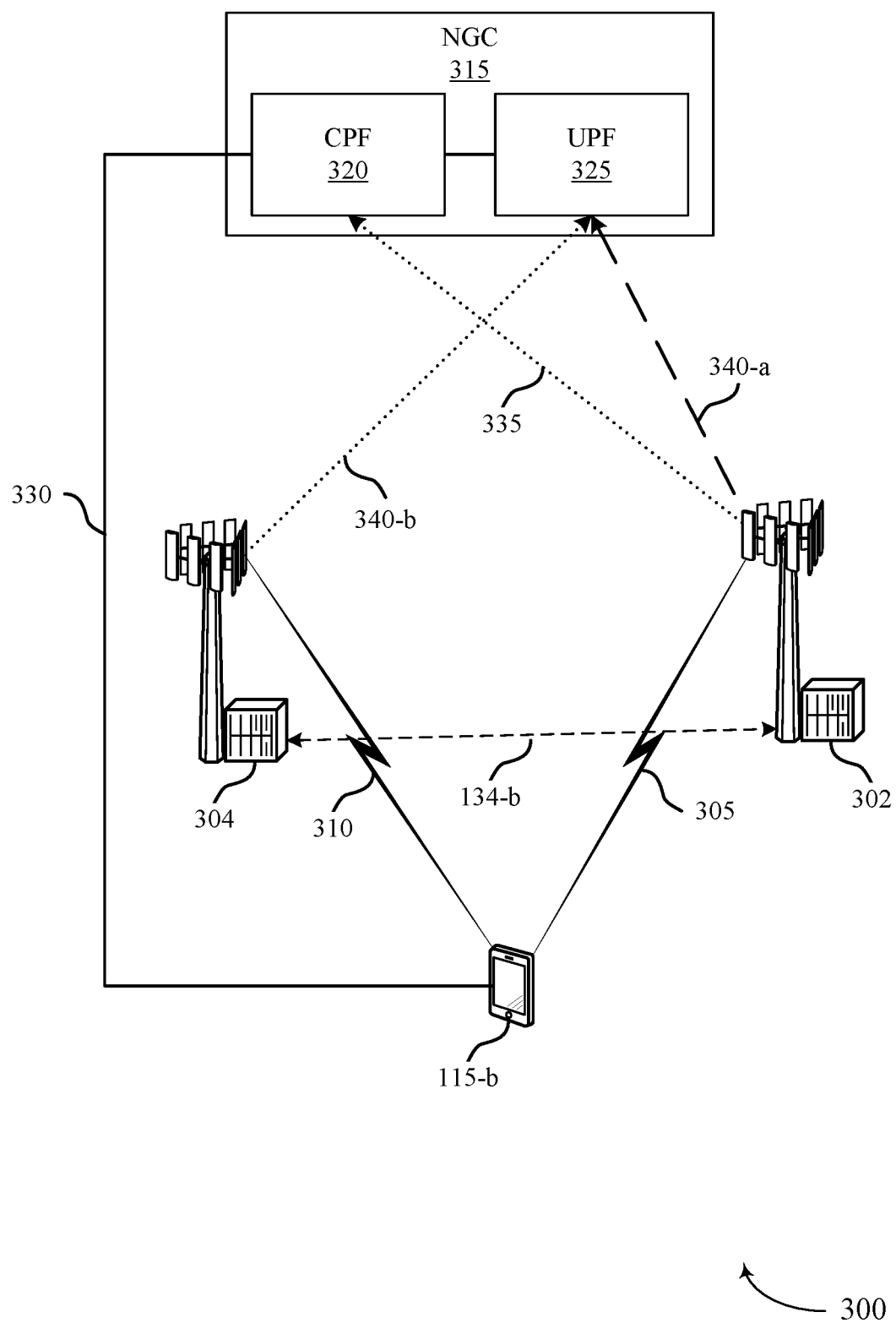
FIG. 3 illustrates an example of a wireless communications system that supports MCG and SCG coexistence in accordance with aspects of the present disclosure.

FIG. 3 illustrates an example of a wireless communications system 300 that supports MCG and SCG coexistence in accordance with aspects of the present disclosure. In some examples, wireless communications system 300 may implement aspects of wireless communications system 100.

Wireless communications system 300 may implement a dual connectivity scheme to improve throughput for UE 115-b. UE 115-b may simultaneously be connected to a gNB 302 for NR communications via an NR link 305 and to an eNB 304 for LTE communications via an LTE link 310. The gNB 302 may provide an MCG and control an SCG provided by the eNB 304. The gNB 302 may provide an anchor carrier associated with the same RAT as the MCG.

Wireless communications system 300 may implement an SCG bearer dual connectivity scheme. UE 115-b may connect to a CPF 320 of an NGC 315 via an NG1 connection 330. The gNB 302 may connect with the CPF 320 and a UPF 325 of the NGC 315 via an NG2 connection 335 and NG3 connection 340-a, respectively. In the SCG bearer configuration, the eNB 304 may have a direct link to the UPF 325 of the NGC 315 via NG3 340-b, the two cell groups exchanging information over backhaul link 134-b.

UE 115-b may have similar restrictions as UE 115-a in FIG. 2, which may include single uplink transmission. Thus, the wireless communications system 300 may implement techniques to improve NR and LTE coexistence when using an NR anchor carrier in a dual connectivity scheme. As described in FIG. 2, the NGC 315, the MCG, and the SCG may implement a priority scheme for scheduling LTE and NR transmissions, and the higher priority cell group may reserve sets of uplink slots, downlink slots, or both uplink and downlink slots. The lower priority cell group may schedule the non-reserved slots or, in some cases, make reservations after the higher priority cell group. A cell group (e.g., the MCG) may indicate the reserved slots and slot format in an SFI as described above.

Figure 4:
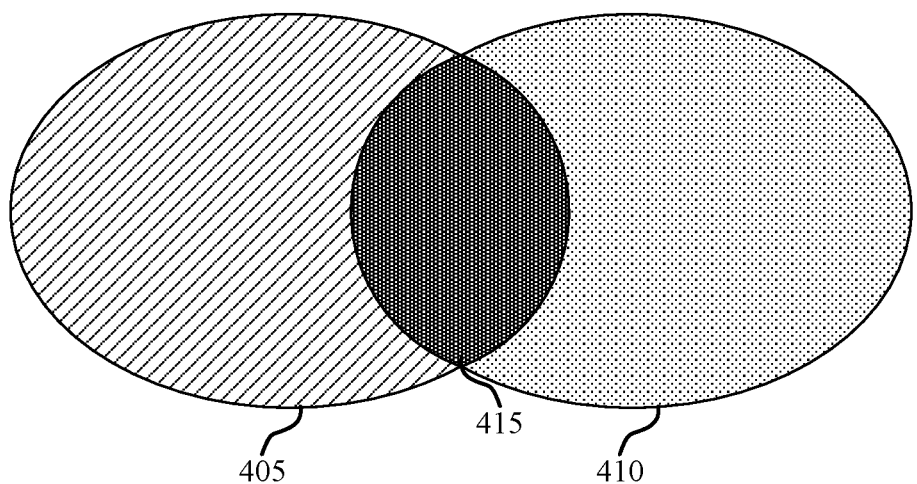
FIG. 4 illustrates an example of a slot reservation distribution that supports MCG and SCG coexistence in accordance with aspects of the present disclosure.
Figure 4:
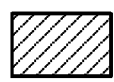
Figure 4:
Figure 4:
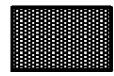

FIG. 4 illustrates an example of a slot reservation distribution 400 that supports MCG and SCG coexistence in accordance with aspects of the present disclosure. In some examples, slot reservation distribution 400 may implement aspects of wireless communications system 100. The slot reservation distribution 400 generally relates to a dual connectivity scheme described in FIGS. 2 and 3, where a UE 115 is connected to an eNB and a gNB for LTE and NR communications respectively. The slot reservation distribution 400 may include MCG reserved slots 405, SCG reserved slots 410, and non-reserved slots 415. The MCG reserved slots 405 may represent slots reserved by the MCG, while the SCG reserved slots 410 may represent slots reserved by the SCG. The non-reserved slots 415 may be available for communications with either the MCG or the SCG.

There may be a total number of slots available within a system bandwidth for a period of time. As described in FIG. 2, the higher priority cell group may reserve some slots for the higher priority RAT. The higher priority cell group may schedule high priority signals over these slots, such as HARQ feedback or PUCCH. The high priority reserved slots may be indicated to the low priority cell group, and the low priority cell group may not use the slots reserved for the high priority cell group.

In some cases, NR may support multiple subcarrier spacing configurations, such that some slot durations in NR may be a fraction of a subframe in LTE. If an NR slot is reserved, a subframe which overlaps the reserved slot may not be used for LTE. Similarly, if a subframe is reserved for LTE, the slots that overlap with the reserved subframe may not be used by NR.

As an example, NR may be the higher priority RAT, and LTE may be the lower priority RAT. The MCG may correspond to a gNB for NR communications, and the SCG may correspond to an eNB for LTE communications. The MCG may reserve some slots for NR and transmit an SFI indicating the MCG reserved slots 405. In some cases, the SCG may reserve subframes for LTE and transmit an SFI indicating the slots that overlap with SCG reserved subframes. The SCG may reserve slots or subframes which do not overlap with any slot of the MCG reserved slots 405. Slots which were not reserved may be shown as the non-reserved slots 415. The MCG and the SCG may independently schedule devices for LTE or NR using the non-reserved slots 415.

Figure 5:
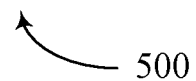
FIG. 5 illustrates an example of a dual carrier configuration table that supports MCG and SCG coexistence in accordance with aspects of the present disclosure.

FIG. 5 illustrates an example of a dual carrier configuration table 500 that supports MCG and SCG coexistence in accordance with aspects of the present disclosure. In some examples, dual carrier configuration table 500 may implement aspects of wireless communications system 100. Dual carrier configuration table 500 generally relates to dual carrier configurations for a wireless communications system, such as those described in FIGS. 2 and 3.

The dual carrier configuration table 500 includes four dual carrier configurations 505. For each dual carrier configuration 505, the neighboring columns show the multiplexing configurations for the MCG 510 and the SCG 515. Generally, the dual carrier configurations 505 are for a UE 115 with an NR anchor carrier connected to an NGC. The dual carrier configurations 505 may have a split bearer or an SCG bearer.

For example, in case 1, the MCG 510 may support TDD communications and the SCG 515 may support FDD communications. The MCG 510 may time-division multiplex NR uplink and downlink transmissions, and the SCG 515 may frequency-division multiplex LTE uplink and downlink transmissions.

In some examples, case 1 may be similar to TDD-FDD carrier aggregation with a TDD PCell. A downlink-reference uplink/downlink configuration for an LTE FDD SCG can be configured and used for scheduling and for HARQ timing of the LTE FDD carrier. An FDD timing configuration (e.g., periodicity and offset) may be applied to an LTE physical random access channel (PRACH) and sounding reference signals (SRSs) on an LTE uplink carrier. The UE may not be configured to support transmission of LTE PRACH or SRS transmissions which do not overlap configured HARQ-ACK transmission occasions. In some cases, a UE-specific HARQ subframe offset can be configured.

In case 2, the MCG 510 may support FDD NR communications, and the SCG 515 may support FDD LTE communications. In some cases, the second configuration may be handled by scheduling. For example, the MCG 510 and the SCG 515 may schedule uplink and downlink slots to meet network constraints (e.g., single uplink, avoiding self-interference, power limitations, etc.). In some other examples, the MCG 510 may implement slot and subframe reservation for NR in the case 2 configuration. Reserved slots may be configured based on a semi-static SFI. For example, in a single uplink transmission constraint, certain uplink slots may be reserved for NR transmission, and LTE uplink may not be allowed during the reserved slots for NR. Likewise, NR uplink transmission may not be allowed during a slot that overlaps with reserved subframes for LTE. LTE may be scheduled on subframes which do not overlap with reserved NR slots. LTE may avoid using reserved slots with proper downlink-reference uplink/downlink configurations. The described techniques may effectively convert an FDD carrier to a TDD-like carrier to facilitate TDM, which may reduce complexity of reserving slots. In some cases, the network may reserve subframes using a dynamic SFI for case 2.

In case 3, the MCG 510 may support TDD with a supplemented uplink, and the SCG 515 may support FDD. In supplemented uplink, LTE uplink for the SCG 515 may be time-division multiplexed with NR uplink. Case 4 may be TDD for the MCG 510 and TDD for the SCG 515.

Cases 3 and 4 may have a single uplink transmission restriction. In some cases, an LTE and NR uplink and downlink frame structure may be jointly determined by the MCG 510 and the SCG 515, which may improve LTE and NR coexistence. In some other examples, the NR downlink and uplink frame structure may be semi-statically configured with a higher priority. For example, the UE 115 may transmit LTE uplink signals in subframes where the UE 115 is not scheduled for NR uplink transmission (e.g., according to the frame structure). The NR slots may be semi-statically configured or reserved to be downlink, uplink, or unknown (e.g., either uplink or downlink) within the frame structure. The UE 115 may transmit LTE uplink signals at least in subframes where the corresponding NR slots are configured as downlink or unknown, or any slot where the frame structure does not indicate that the slot is for NR uplink.

Figure 6A:
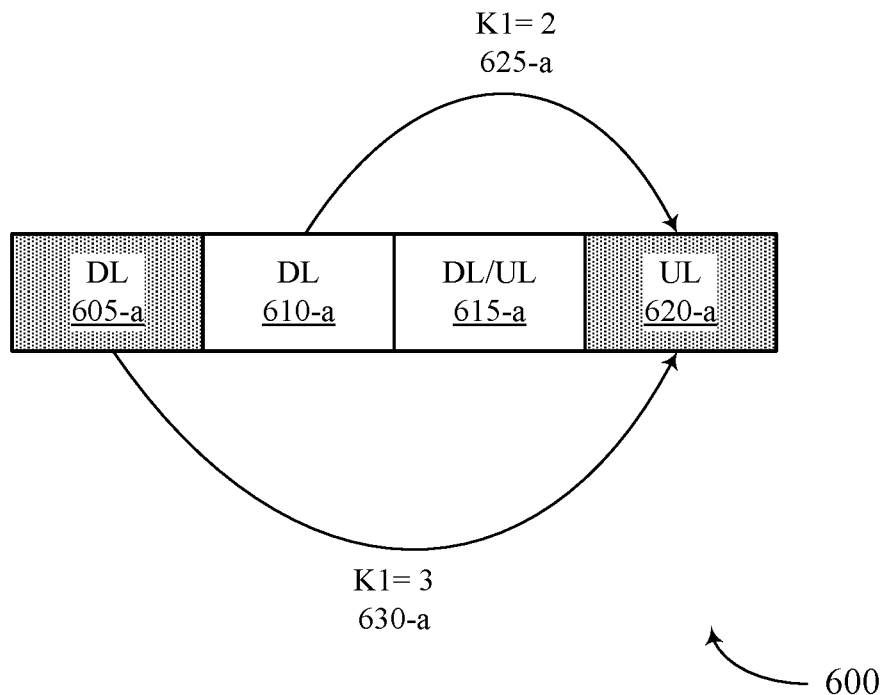
FIGS. 6A and 6B illustrate examples of hybrid automatic repeat request (HARQ) timing offset configurations that support MCG and SCG coexistence in accordance with aspects of the present disclosure.
Figure 6B:
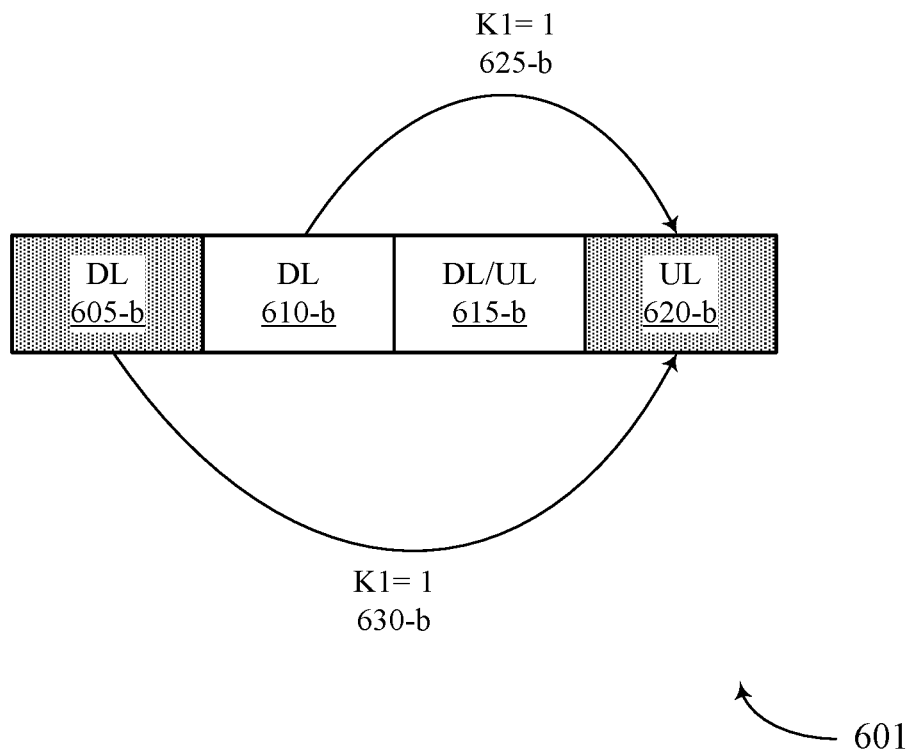

FIGS. 6A and 6B illustrate examples of HARQ timing offset configurations 600 and 601 that support MCG and SCG coexistence in accordance with aspects of the present disclosure. In some examples, HARQ timing offset configurations 600 and 601 may implement aspects of wireless communications system 100. The HARQ timing offset configurations generally relates to transmission feedback in a wireless communications system supporting a dual carrier configuration.

As described herein, priority may be given to one RAT over another, and slots may be classified as reserved or non-reserved. For example, NR may be given priority over LTE. In this example, NR transmission and reception on reserved slots may be highly reliable, while non-reserved slots are less reliable. Thus, the serving cells may schedule high importance signals for the reserved slots. For example, HARQ feedback may be transmitted on a slot that is reserved to carry NR PUCCH. An offset, K1, may be used to indicate an offset from a slot used for data or a physical downlink shared channel (PDSCH) transmission to a corresponding HARQ feedback slot.

In HARQ timing offset configuration 600, K1 625-*a* and K1 630-*a* measure both reserved and non-reserved slots. For example, a UE 115 receives a data transmission in reserved downlink slot 605-*a*. After two non-reserved slots, including non-reserved downlink slot 610-*a* and non-reserved uplink/downlink slot 615-*a*, the UE 115 may transmit HARQ feedback for the data transmission on reserved uplink slot 620-*a* and, in some examples, for a data transmission received on non-reserved downlink slot 610-*a*. The HARQ feedback for reserved downlink slot 605-*a* may be transmitted three slots later, so K1 630-*a* may be set to 3. The HARQ feedback for non-reserved downlink slot 610-*a* may be transmitted two slots later, so K1 625-*a* may be set to 2.

In HARQ timing offset configuration 601, K1 625-*b* and K1 630-*b* measure only reserved slots. For example, a UE 115 receives a data transmission in reserved downlink slot 605-*b*. After two non-reserved slots, including non-reserved downlink slot 610-*b* and non-reserved uplink/downlink slot 615-*b*, the UE 115 may transmit HARQ feedback for the data transmission on reserved uplink slot 620-*b* and, in some examples, for a data transmission received on non-reserved downlink slot 610-*b*. The HARQ feedback for reserved downlink slot 605-*b* may be transmitted one reserved slot later, so K1 630-*b* may be set to 1. The HARQ feedback for non-reserved downlink slot 610-*b* may also be transmitted one reserved slot later, so K1 625-*b* may also be set to 1. In some cases, this may result in lower values for K1, which may reduce a number of bits in the K1 bit field. The interpretation of K1 may be indicated via RRC signaling, or another higher layer signaling.

Figure 7:
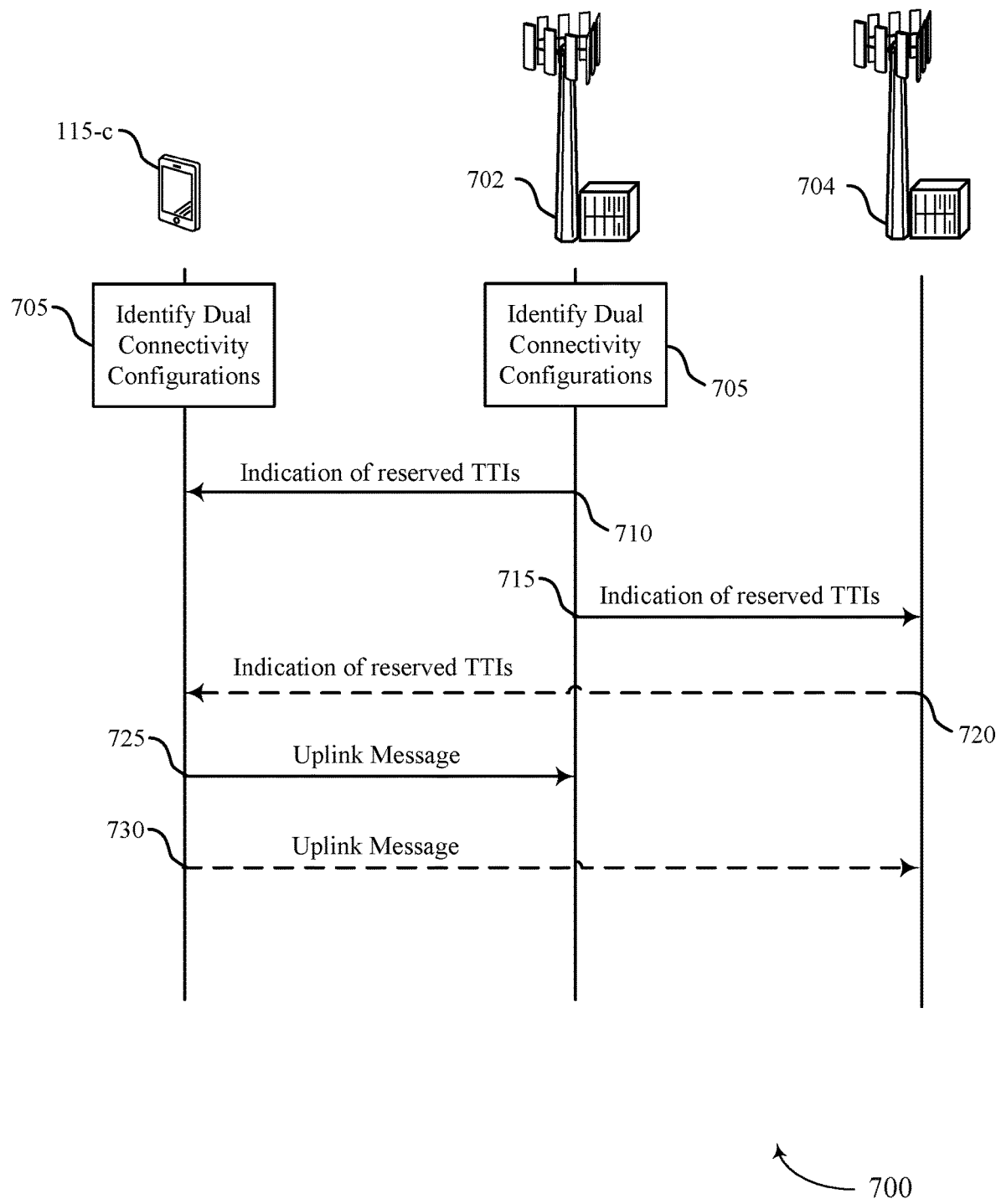
FIG. 7 illustrates an example of a process flow that supports MCG and SCG coexistence in accordance with aspects of the present disclosure.

FIG. 7 illustrates an example of a process flow 700 that supports MCG and SCG coexistence in accordance with aspects of the present disclosure. In some examples, process flow 700 may implement aspects of wireless communications system 100. Process flow 700 may include UE 115-*c*, gNB 702, and eNB 704. UE 115-*c* may be an example of a UE 115 as described herein. The gNB 702 may be an example of a gNB 202 or 302 as described with reference to FIGS. 2 and 3. The eNB 704 may be an example of an eNB 204 or 304 as described with reference to FIGS. 2 and 3. The gNB 702 and the eNB 704 may each be an example of a base station 105 as described herein.

At 705, UE 115-*c* may identify that it is operating in dual connectivity with an MCG and an SCG. The MCG may correspond to gNB 702, and the SCG may correspond to an eNB 704. Similarly, at 705, gNB 702 may identify that it is operating as an MCG in the dual connectivity with UE 115-*c*.

At 710, gNB 702 may transmit an indication of reserved TTIs that are reserved for priority uplink communications with the MCG. The TTIs may be, for example, slots for NR or subframes for LTE. At 715, gNB 702 may indicate, to the SCG (e.g., the eNB 704) the reserved TTIs and also additional TTIs that are available for uplink communications with either the MCG or the SCG. In some cases, at 720, UE 115-c may receive an indication of additionally reserved TTIs that are reserved for uplink communication with the SCG, where the reserved TTIs and the additionally reserved TTIs are disjoint in time.

At 725, UE 115-c may transmit one or more uplink messages to the MCG using the reserved TTIs. At 730, UE 115-c may transmit one or more uplink messages to the SCG using the additionally reserved TTIs.

In some cases, UE 115-c may receive a schedule for the additional TTIs (e.g., from the gNB 702 or the eNB 704). The schedule may facilitate avoidance of simultaneous uplink transmissions to both the gNB 702 and the eNB. UE 115-c may transmit one or more uplink messages to either the MCG or the SCG using the additional TTIs.

Figure 8:
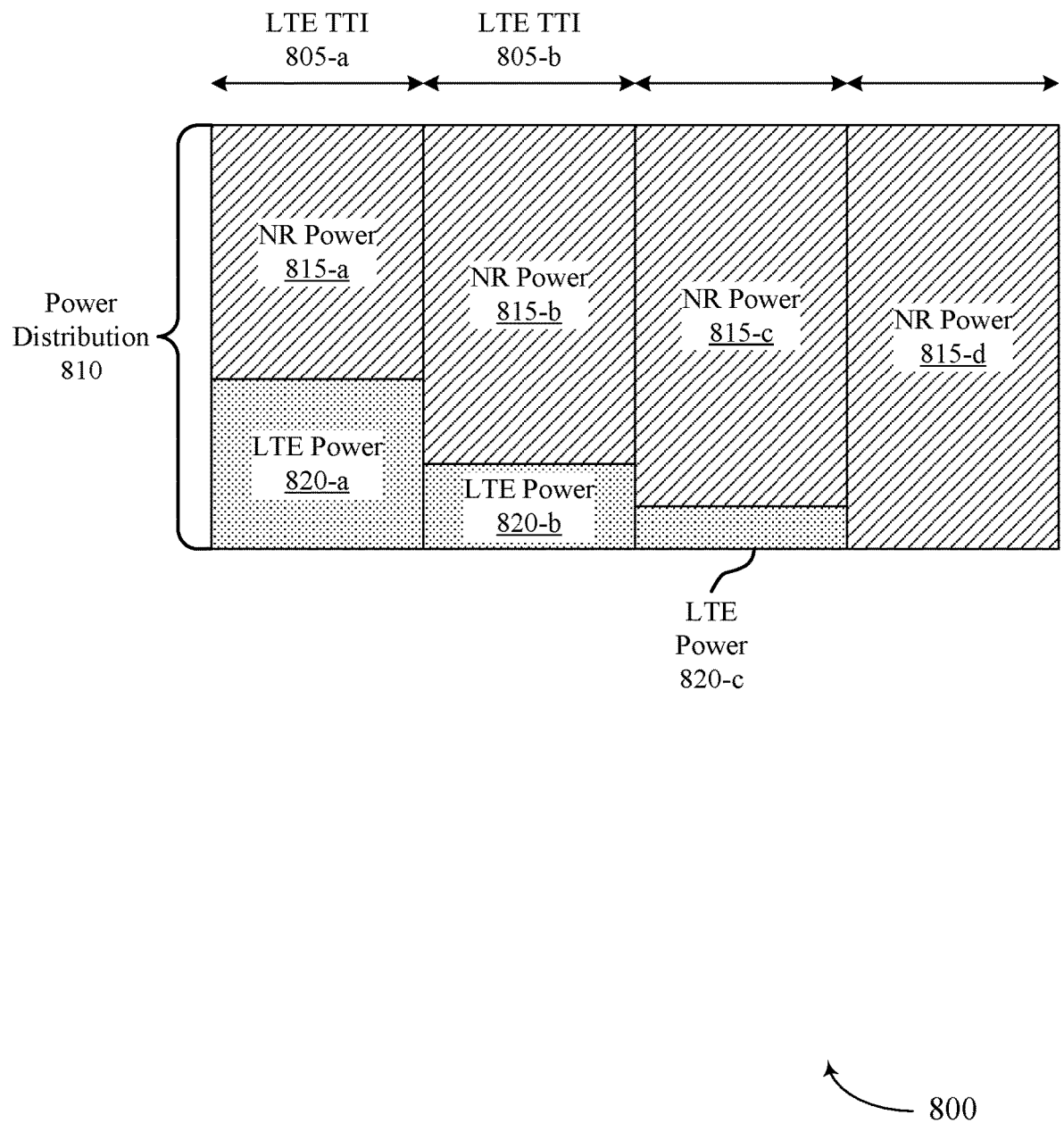
FIG. 8 illustrates an example of a power variation that supports MCG and SCG coexistence in accordance with aspects of the present disclosure.

FIG. 8 illustrates an example of a power variation 800 that supports MCG and SCG coexistence in accordance with aspects of the present disclosure. In some examples, power variation 800 may implement aspects of wireless communications system 100.

A UE 115, such as a UE 115 described in FIG. 2 or 3, may be configured for a dual uplink configuration, splitting the uplink transmission between NR and LTE. For example, a gNB may provide an MCG for NR communications, and an eNB may provide an SCG for LTE communications. The UE 115 may implement power control techniques for the SCG and the MCG. As described herein, one of the cell groups may have a higher priority. In this example, the MCG providing NR communications may be the higher priority cell group, and the SCG providing LTE communications may be the lower priority cell groups. In another example, the MCG may be the lower priority cell group, or the MCG may provide LTE communications and the SCG may provide NR communications.

As described in FIG. 2, the UE 115 may implement power control techniques. For example, if an aggregated transmit power exceeds the maximum transmit power allowance and the uplink channel start at the same time, the UE 115 may drop or scale down the transmit power of lower priority channels. In some other examples, if the aggregated transmit power exceeds the maximum power allowance and the uplink channels start at different times, the UE 115 may drop or scale down the transmit power of lower priority channels, or the UE 115 may scale down or drop uplink channels which start later (e.g., after a TTI).

Power control adjustments may be made at the end of a TTI. The time granularity for power control may follow the RAT which has the larger time granularity. For example, between an LTE implementing a 1 ms TTI (e.g., a subframe) and NR with 30 kHZ subcarrier spacing (SCS) or higher (e.g., 0.5 ms slots), LTE has a larger time granularity, as 1 ms is longer than 0.5 ms. Therefore, the power control may be based on the 1 ms TTI. Thus, power control adjustments may be made after a subframe, even if there are multiple slots within the subframe.

In another example, LTE may support shortened TTIs (sTTIs), where the sTTI durations may be 2 or 3 symbol periods long. For example, the UE may transmit 6 sTTIs within 1 ms in a {3, 2, 2, 2, 2, 3} format, indicating a 3-symbol sTTI followed by four 2-symbol sTTIs and ending with another 3-symbol sTTI. In this example, a 0.5 ms slot for NR would have a longer TTI than an sTTI of LTE. Therefore, power control adaptations may occur after the 0.5 ms NR slots (e.g., after the first three sTTIs of length 3, 2, and 2 symbol periods). Thus, there may not be power variation within an NR slot. For example, the UE 115 may not change transmission power after an LTE sTTI if the NR slot is longer than the LTE sTTIs.

In some other examples, for example if LTE uses sTTIs and NR uses 0.25 ms slots, the UE 115 may wait to make a power adjustment until either a new subframe occurs, a new uplink channel is established, or there is an alignment of an end of an LTE sTTI and an end of an NR slot.

The illustrated example shows a UE 115 adjusting a transmission power distribution 810 after LTE TTIs 805. The total transmission power is shared between an NR power 815 and an LTE power 820. For example, during a first LTE TTI 805-a, the NR power 815-a may use 60% of the transmission power distribution 810, and the LTE power 820-a may use 40% of the transmission power distribution 810. After the first LTE TTI 805-a, the UE 115 may adjust the transmission power distribution 810, so that the NR power 815-b is 80% and the LTE power 820-b is 20%. Even if the NR communications uses a smaller TTI (e.g., a 0.5 ms slot compared to the 1 ms subframe of LTE), the UE 115 may make power adjustments based on the larger time granularity, corresponding to the LTE TTI 805. The UE 115 may make transmission power adjustments in later TTIs 805 such that NR power 815-c is 90% of the transmission power and LTE power 820-c is 10% of the transmission power in a third TTI 805-c. By a fourth TTI 805-d, the power distribution 810 may be used entirely for NR communications, and NR power 815-d may use 100% of the transmission power.

Figure 9:
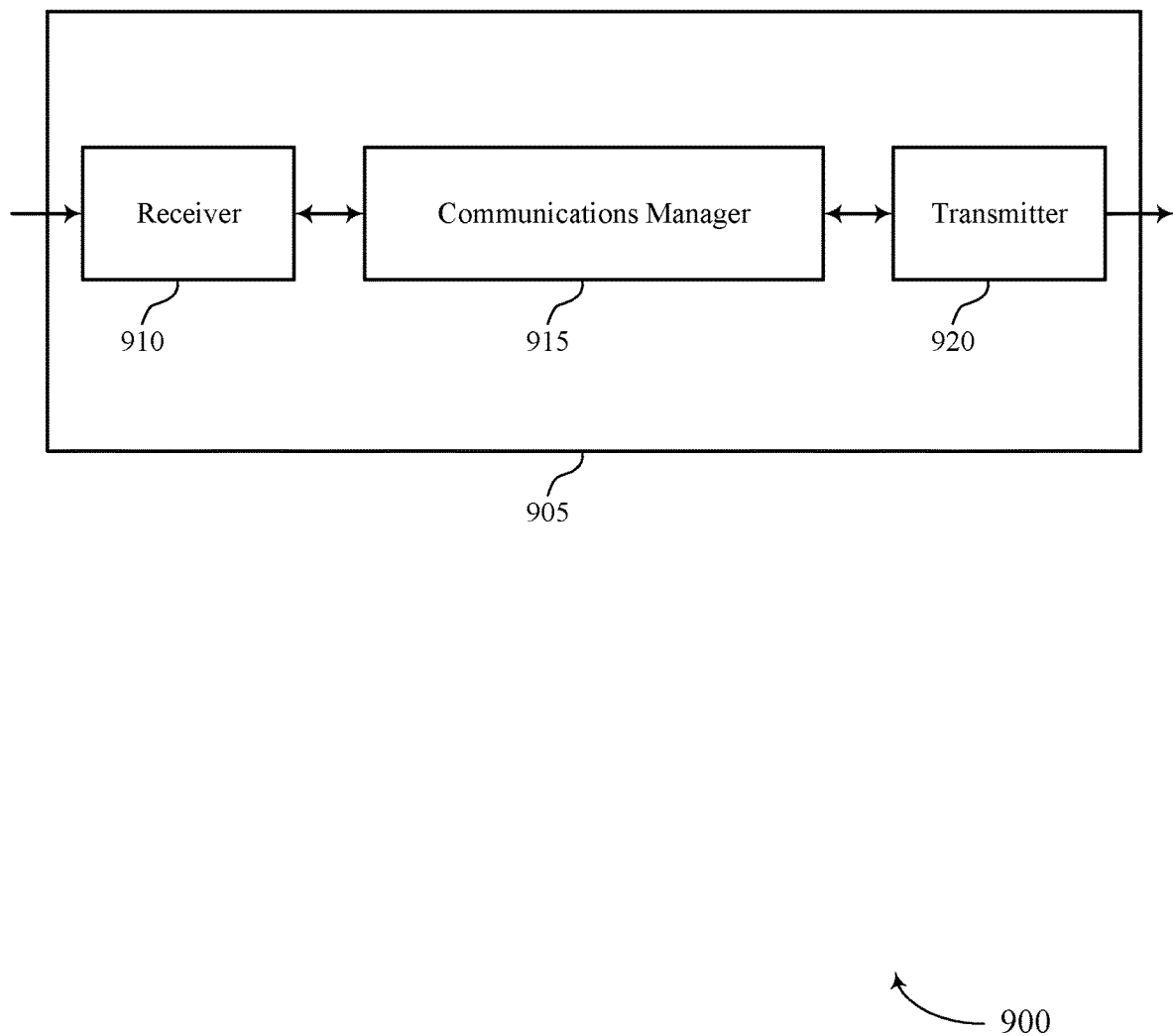
FIGS. 9 and 10 show block diagrams of devices that support MCG and SCG coexistence in accordance with aspects of the present disclosure.

FIG. 9 shows a block diagram 900 of a device 905 that supports MCG and SCG coexistence in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to MCG and SCG coexistence, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that the UE is operating in dual connectivity with a MCG and a SCG, receive, from the MCG, an indication of reserved TTIs that are reserved for priority UL communication with the MCG, identify additional TTIs that are available for UL communication with either the MCG or the SCG, transmit one or more UL messages to the MCG using the reserved TTIs, and transmit one or more UL messages to either the MCG or the SCG using the additional TTIs. The communications manager 915 may be an example of aspects of the communications manager 1210 described with reference to FIG. 12.

The communications manager 915, or its sub-components, may be implemented in hardware, code (e.g., software or firmware) executed by a processor, or any combination thereof. If implemented in code executed by a processor, the functions of the communications manager 915, or its subcomponents may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
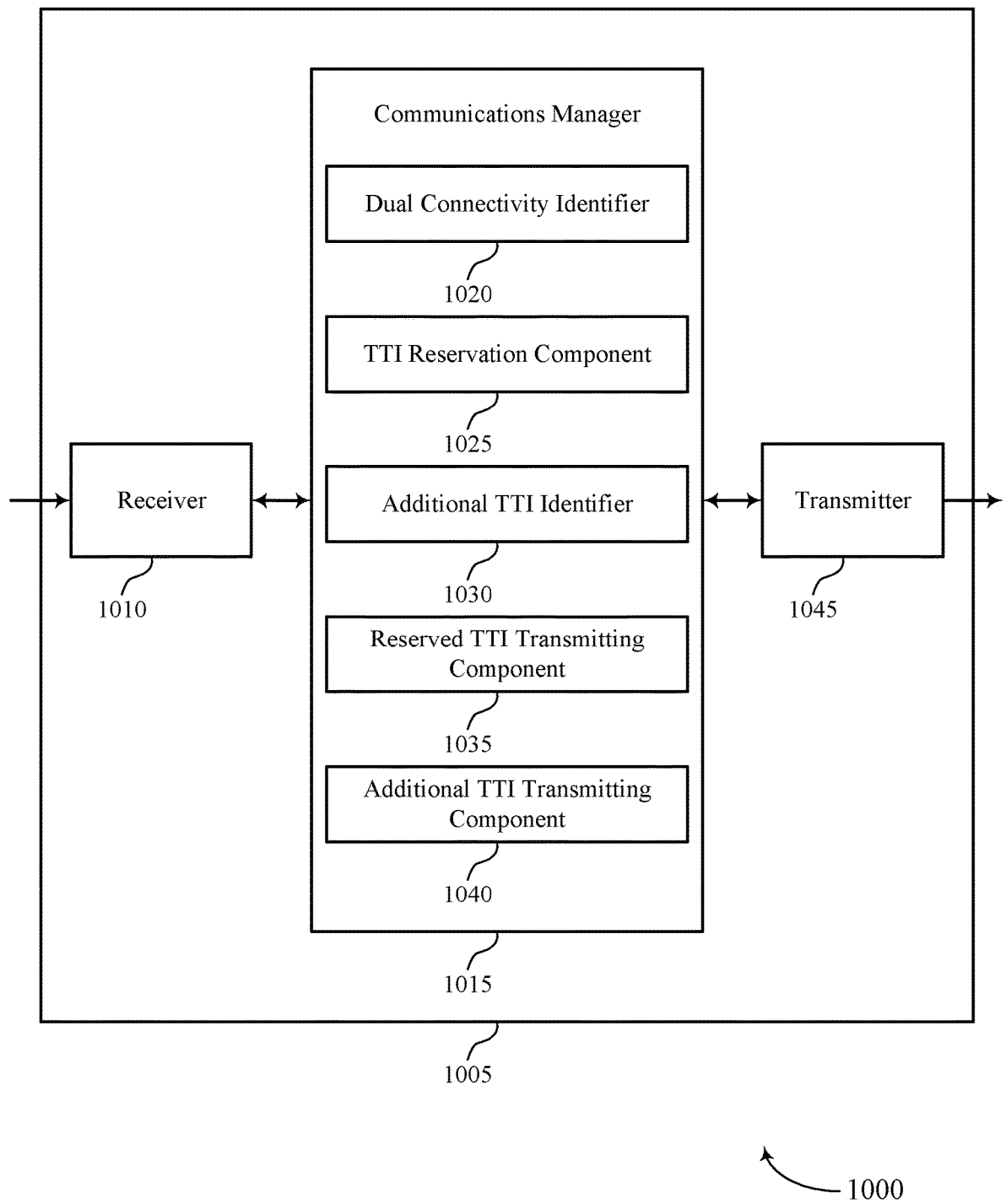

FIG. 10 shows a block diagram 1000 of a device 1005 that supports MCG and SCG coexistence in accordance with aspects of the present disclosure. The device 1005 may be an example of aspects of a device 905 or a UE 115 as described with reference to FIGS. 1 and 9. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to MCG and SCG coexistence, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described with reference to FIG. 9. The communications manager 1015 may include a dual connectivity identifier 1020, a TTI reservation component 1025, an additional TTI identifier 1030, a reserved TTI transmitting component 1035, and an additional TTI transmitting component 1040. The communications manager 1015 may be an example of aspects of the communications manager 1210 described with reference to FIG. 12.

The dual connectivity identifier 1020 may identify that the UE is operating in dual connectivity with a MCG and a SCG. The TTI reservation component 1025 may receive, from the MCG, an indication of reserved TTIs that are reserved for priority UL communication with the MCG. The additional TTI identifier 1030 may identify additional TTIs that are available for UL communication with either the MCG or the SCG. The reserved TTI transmitting component 1035 may transmit one or more UL messages to the MCG using the reserved TTIs. The additional TTI transmitting component 1040 may transmit one or more UL messages to either the MCG or the SCG using the additional TTIs.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
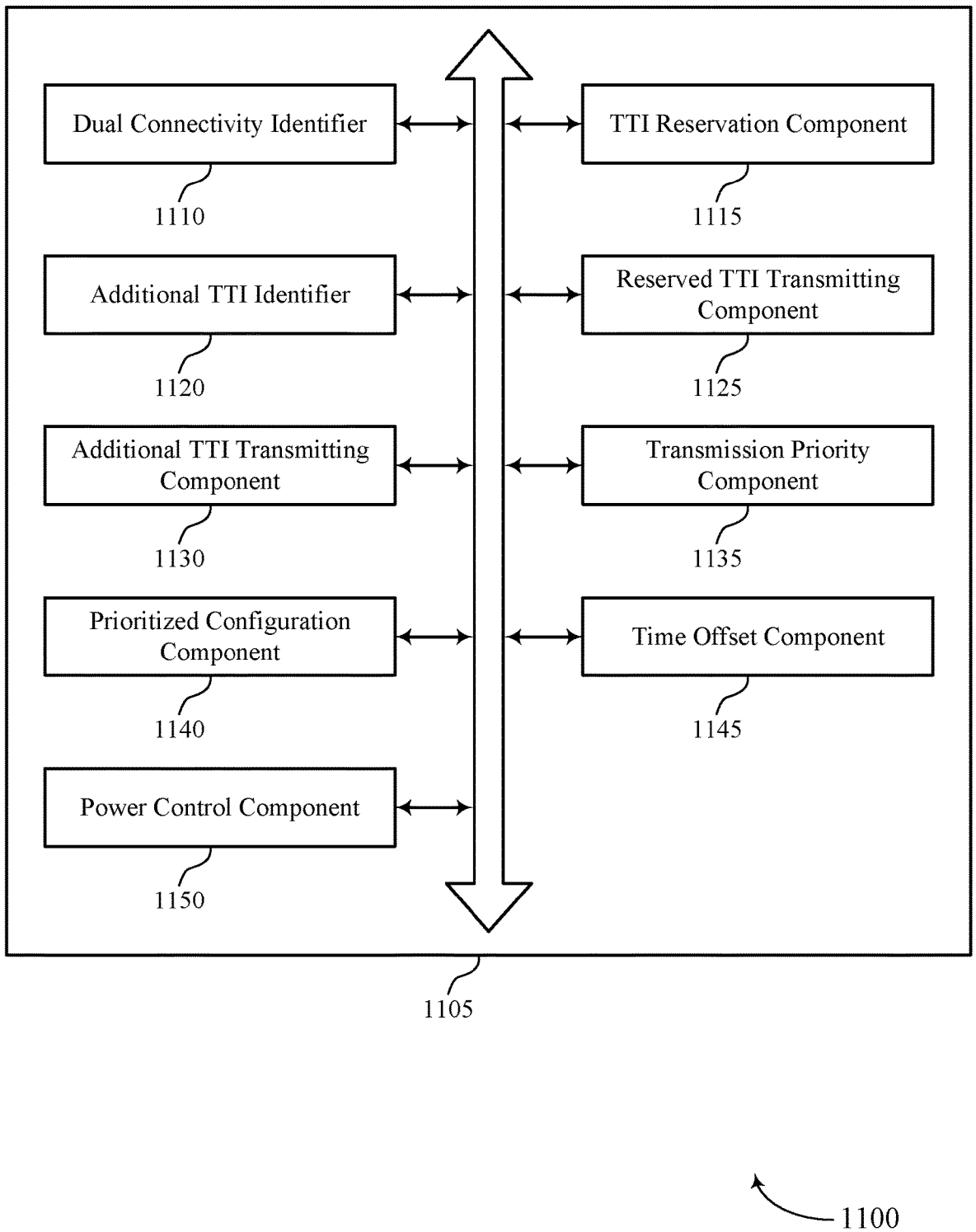
FIG. 11 shows a block diagram of a device that supports MCG and SCG coexistence in accordance with aspects of the present disclosure.

FIG. 11 shows a block diagram 1100 of a communications manager 1105 that supports MCG and SCG coexistence in accordance with aspects of the present disclosure. The communications manager 1105 may be an example of aspects of a communications manager 915, a communications manager 1015, or a communications manager 1210 described with reference to FIGS. 9, 10, and 12. The communications manager 1105 may include a dual connectivity identifier 1110, a TTI reservation component 1115, an additional TTI identifier 1120, a reserved TTI transmitting component 1125, an additional TTI transmitting component 1130, a transmission priority component 1135, a prioritized configuration component 1140, a time offset component 1145, and a power control component 1150. Each of these modules may communicate, directly or indirectly, with one another (e.g., via one or more buses).

The dual connectivity identifier 1110 may identify that the UE is operating in dual connectivity with a MCG and a SCG. In some examples, the dual connectivity identifier 1110 may both the MCG and the SCG are configured for FDD operation. In some examples, the dual connectivity identifier 1110 may both the MCG and the SCG are configured for TDD operation. In some cases, the MCG is configured for TDD operation and the SCG is configured for FDD operation. In some cases, the MCG is configured for TDD operation and the SCG is configured for FDD operation, with UL transmissions to the SCG being time-shared with supplemental uplink (SUL) transmissions to the MCG.

The TTI reservation component 1115 may receive, from the MCG, an indication of reserved TTIs that are reserved for priority UL communication with the MCG. In some examples, the TTI reservation component 1115 may receive, from the SCG, an indication of additionally reserved TTIs that are reserved for UL communication with the SCG, where the reserved TTIs and the additionally reserved TTIs are disjoint in time.

In some examples, the TTI reservation component 1115 may receive a SFI that identifies a configuration for UL TTIs, DL TTIs, unknown TTIs, or combinations of the same, where the reserved TTIs include the UL TTIs. In some examples, the TTI reservation component 1115 may receive a cell-specific configured SFI. In some examples, the TTI reservation component 1115 may receive a UE-specific configured SFI, where the UE-specific configured SFI overrides any received cell-specific configured SFI. In some examples, the TTI reservation component 1115 may receive a dynamic SFI via DCI, where the dynamic SFI is specific for an upcoming TTI or set of TTIs.

In some examples, the TTI reservation component 1115 may receive a joint configuration that includes the indication of reserved TTIs that are reserved for UL or DL communications with the MCG, as well as an indication of which of the additional TTIs are to be used for UL or DL communications with the MCG and which of the additional TTIs are to be used for UL or DL communications with the SCG. In some cases, the indication further indicates DL TTIs, unknown TTIs, or both which are reserved for communication with the MCG. The additional TTI identifier 1120 may identify additional TTIs that are available for UL communication with either the MCG or the SCG. In some cases, the one or more UL messages transmitted using the additional TTIs include LTE PRACH messages, SRS messages, HARQ messages, or a combination of the same. The reserved TTI transmitting component 1125 may transmit one or more UL messages to the MCG using the reserved TTIs.

The additional TTI transmitting component 1130 may transmit one or more UL messages to either the MCG or the SCG using the additional TTIs. In some examples, the additional TTI transmitting component 1130 may transmit one or more UL messages to the SCG using the additionally reserved TTIs. In some examples, the additional TTI transmitting component 1130 may receive a schedule for using one or more of the additional TTIs for UL communication with either the MCG or the SCG, the schedule facilitating avoidance of simultaneous UL transmissions to both the MCG and the SCG, where transmitting the one or more UL messages using the additional TTIs is in accordance with the schedule.

In some examples, the additional TTI transmitting component 1130 may identify an FDD timing configuration for UL transmissions to the SCG, the FDD timing configuration facilitating avoidance of simultaneous UL transmissions to both the MCG and the SCG, where transmitting the one or more UL messages using the additional TTIs is in accordance with the FDD timing configuration. In some examples, the additional TTI transmitting component 1130 may transmit UL messages to the MCG and to the SCG during different TTIs. In some examples, the additional TTI transmitting component 1130 may transmit UL messages to the MCG and to the SCG during a same TTI.

The transmission priority component 1135 may determine that an UL message to the MCG and an UL message to the SCG are both scheduled for a same TTI of the additional TTIs. In some examples, the transmission priority component 1135 may identify a priority between the UL message to the MCG and the UL message to the secondary cell group. In some examples, the transmission priority component 1135 may transmit one of the UL message to the MCG or the UL message to the secondary cell group during the TTI based on the priority. The prioritized configuration component 1140 may receive a prioritized configuration that includes the indication of reserved TTIs that are reserved for UL or DL communications with the MCG, as well as an indication of which of the additional TTIs are to be used for UL or DL communications with the MCG. In some examples, the prioritized configuration component 1140 may transmit the one or more UL messages to the SCG during one of the additional TTIs indicated as being for DL communications with the MCG.

The time offset component 1145 may identify a parameter that indicates a time offset for UL transmission of HARQ feedback after receipt of a data message, where the time offset is in terms of a number of reserved TTIs. In some examples, the time offset component 1145 may transmit HARQ feedback in accordance with the parameter. The power control component 1150 may prioritize power control for each of the UL messages transmitted during the same TTI based on a type of the UL messages. In some examples, the power control component 1150 may prioritize power control for each of the UL messages transmitted during the same TTI based on a start time for each of the UL messages. In some cases, a maximum power control for the UL messages transmitted to the MCG and a maximum power control for the UL messages transmitted to the SCG during the same TTI are each less than respective power controls for UL transmissions during different TTIs.

In some cases, the power control component 1150 may identify a first TTI duration associated with the MCG, identify a second TTI duration associated with the SCG, and apply a transmission power control scheme based at least in part on the first TTI duration and the second TTI duration. In some examples, applying the transmission power control scheme further includes adjusting a transmission power for the UL messages transmitted to the MCG and the UL messages transmitted to the SCG after a TTI of the first TTI duration based at least in part on the first TTI duration being longer than the second TTI duration. In some examples, applying the transmission power control scheme further includes adjusting a transmission power for the UL messages transmitted to the MCG and the UL messages transmitted to the SCG after a TTI of the second TTI duration based at least in part on the second TTI duration being longer than the first TTI duration.

Figure 12:
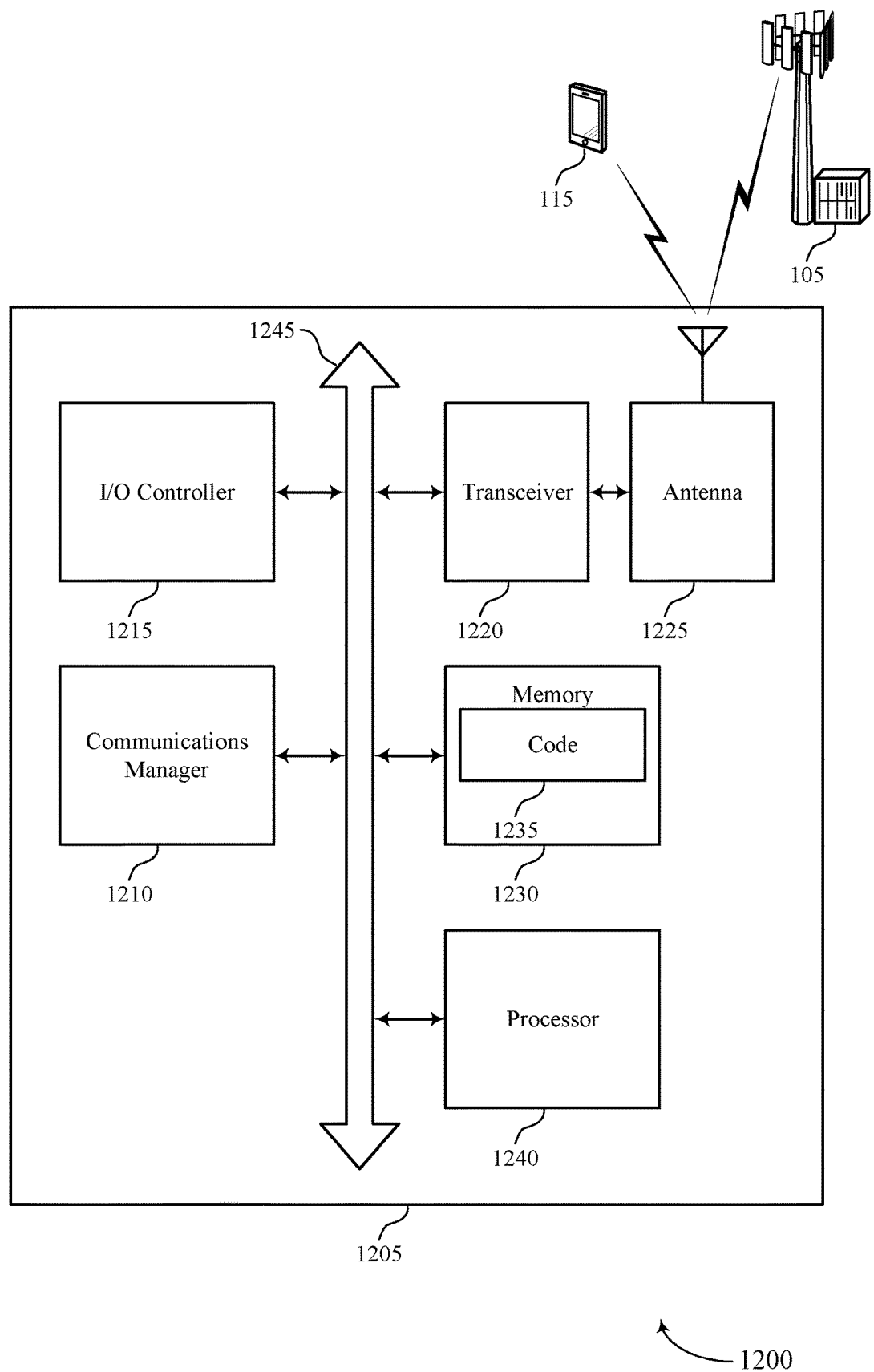
FIG. 12 shows a diagram of a system including a device that supports MCG and SCG coexistence in accordance with aspects of the present disclosure.

FIG. 12 shows a diagram of a system 1200 including a device 1205 that supports MCG and SCG coexistence in accordance with aspects of the present disclosure. The device 1205 may be an example of or include the components of device 905, device 1005, or a UE 115 as described above, e.g., with reference to FIGS. 1, 9, and 10. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify that the UE is operating in dual connectivity with a MCG and a SCG, receive, from the MCG, an indication of reserved TTIs that are reserved for priority UL communication with the MCG, identify additional TTIs that are available for UL communication with either the MCG or the SCG, transmit one or more UL messages to the MCG using the reserved TTIs, and transmit one or more UL messages to either the MCG or the SCG using the additional TTIs.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting MCG and SCG coexistence).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
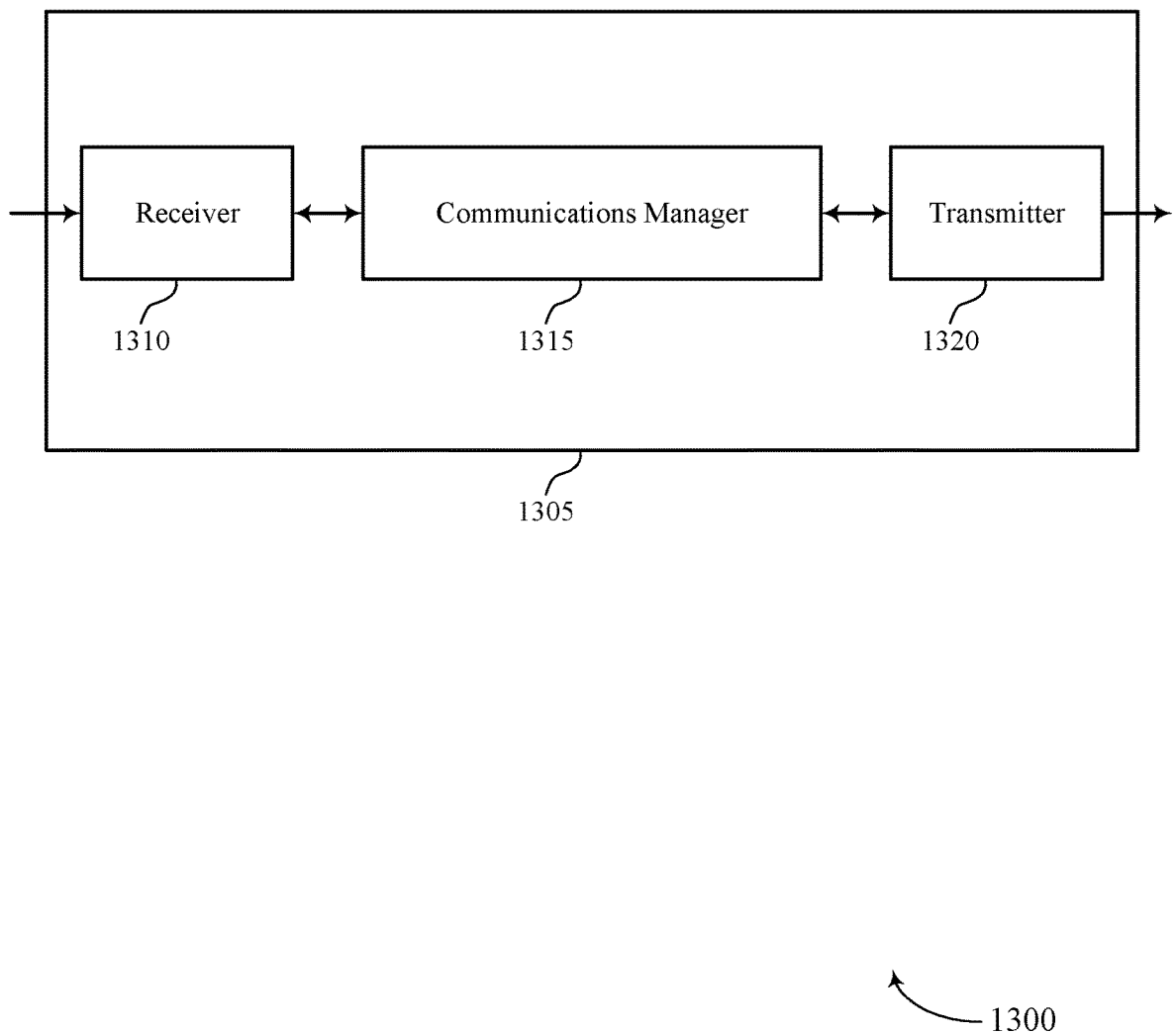
FIGS. 13 and 14 show block diagrams of devices that support MCG and SCG coexistence in accordance with aspects of the present disclosure.

FIG. 13 shows a block diagram 1300 of a device 1305 that supports MCG and SCG coexistence in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to MCG and SCG coexistence, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify that the base station is operating as a MCG in dual connectivity with a UE, transmit, to the UE, an indication of reserved TTIs that are reserved for priority UL communication with the MCG, indicate to a SCG the reserved TTIs and also additional TTIs that are available for UL communication with either the MCG or the SCG, and receive, from the UE, one or more UL messages using the reserved TTIs. The communications manager 1315 may be an example of aspects of the communications manager 1610 described with reference to FIG. 16.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
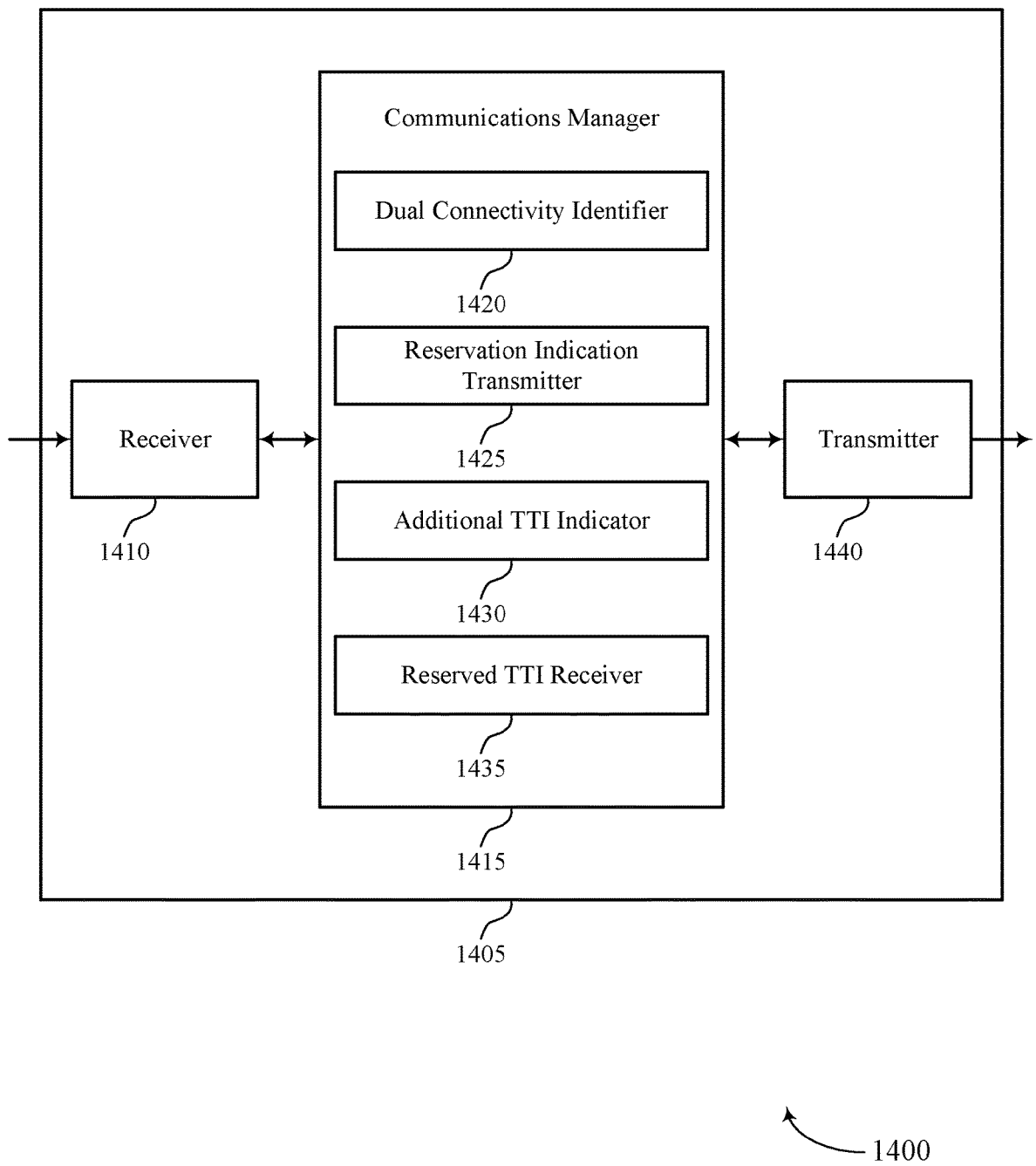

FIG. 14 shows a block diagram 1400 of a device 1405 that supports MCG and SCG coexistence in accordance with aspects of the present disclosure. The device 1405 may be an example of aspects of a device 1305 or a base station 105 as described with reference to FIGS. 1 and 13. The device 1405 may include a receiver 1410, a communications manager 1415, and a transmitter 1440. The device 1405 may also include a processor. Each of these components may be in communication with one another (e.g., via one or more buses).

The receiver 1410 may receive information such as packets, user data, or control information associated with various information channels (e.g., control channels, data channels, and information related to MCG and SCG coexistence, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described with reference to FIG. 13. The communications manager 1415 may include a dual connectivity identifier 1420, a reservation indication transmitter 1425, an additional TTI indicator 1430, and a reserved TTI receiver 1435. The communications manager 1415 may be an example of aspects of the communications manager 1610 described with reference to FIG. 16.

The dual connectivity identifier 1420 may identify that the base station is operating as a MCG in dual connectivity with a UE. The reservation indication transmitter 1425 may transmit, to the UE, an indication of reserved TTIs that are reserved for priority UL communication with the MCG. The additional TTI indicator 1430 may indicate to a SCG the reserved TTIs and also additional TTIs that are available for UL communication with either the MCG or the SCG. The reserved TTI receiver 1435 may receive, from the UE, one or more UL messages using the reserved TTIs.

The transmitter 1440 may transmit signals generated by other components of the device 1405. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
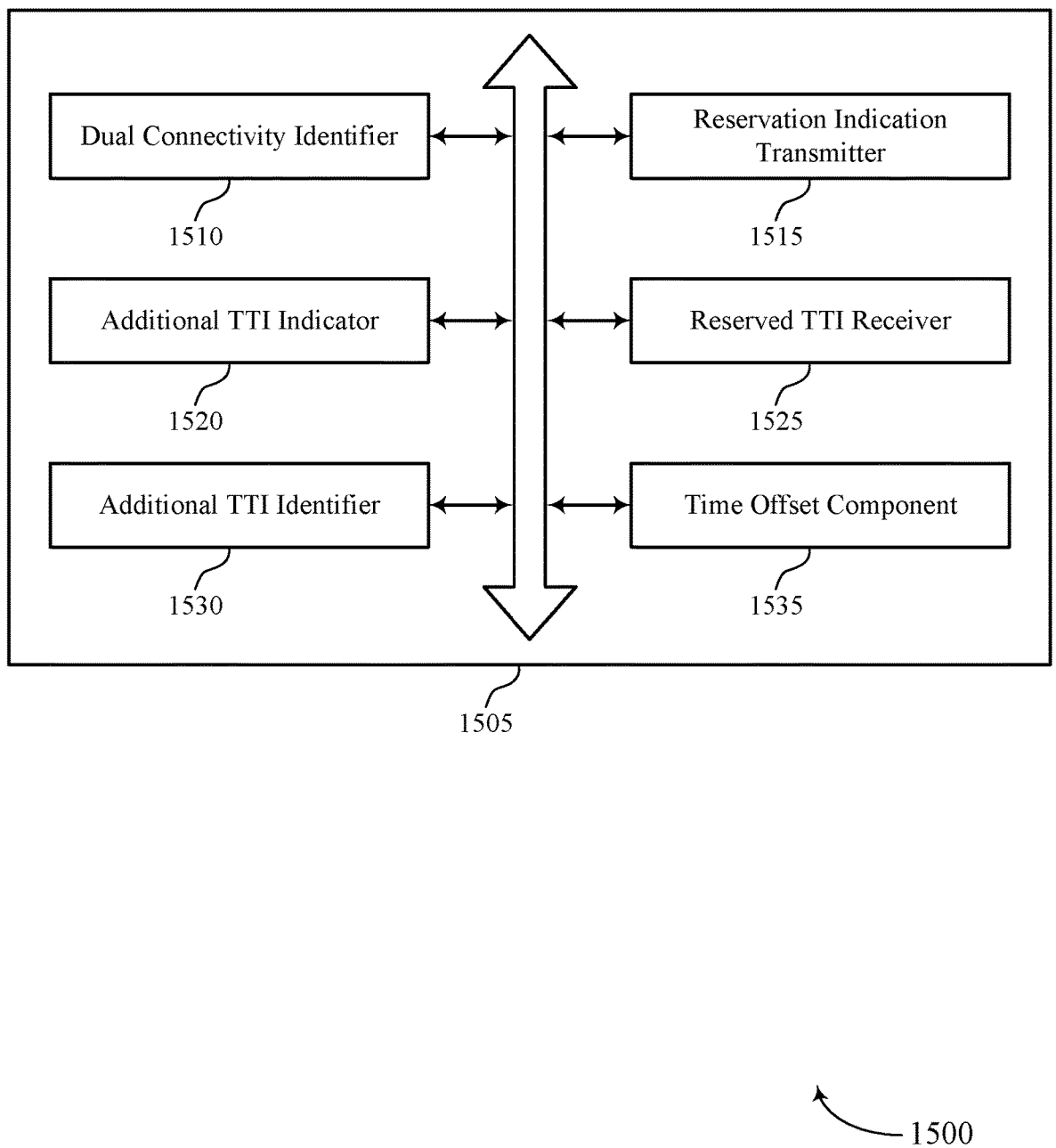
FIG. 15 shows a block diagram of a device that supports MCG and SCG coexistence in accordance with aspects of the present disclosure.

FIG. 15 shows a block diagram 1500 of a communications manager 1505 that supports MCG and SCG coexistence in accordance with aspects of the present disclosure. The communications manager 1505 may be an example of aspects of a communications manager 1315, a communications manager 1415, or a communications manager 1610 described with reference to FIGS. 13, 14, and 16. The communications manager 1505 may include a dual connectivity identifier 1510, a reservation indication transmitter 1515, an additional TTI indicator 1520, a reserved TTI receiver 1525, an additional TTI identifier 1530, and a time offset component 1535. Each of these modules may communicate, directly or indirectly, with one another (e.g., via one or more buses).

The dual connectivity identifier 1510 may identify that the base station is operating as a MCG in dual connectivity with a UE. In some examples, the dual connectivity identifier 1510 may both the MCG and the SCG are configured for FDD operation. In some examples, the dual connectivity identifier 1510 may both the MCG and the SCG are configured for TDD operation.

In some examples, the dual connectivity identifier 1510 may indicate, to the UE, an FDD timing configuration for UL transmissions to the SCG, the FDD timing configuration facilitating avoidance of simultaneous UL transmissions to both the MCG and the SCG. In some cases, the MCG is configured for TDD operation and the SCG is configured for FDD operation. In some cases, the MCG is configured for TDD operation and the SCG is configured for FDD operation, with UL transmissions to the SCG being time-shared with SUL transmissions to the MCG.

The reservation indication transmitter 1515 may transmit, to the UE, an indication of reserved TTIs that are reserved for priority UL communication with the MCG. In some examples, the reservation indication transmitter 1515 may transmit a slot format indication (SFI) that identifies a configuration for UL TTIs, DL TTIs, unknown TTIs, or combinations of the same, where the reserved TTIs include the UL TTIs. In some examples, the reservation indication transmitter 1515 may transmit a cell-specific configured SFI. In some examples, the reservation indication transmitter 1515 may transmit a UE-specific configured SFI, where the UE-specific configured SFI overrides any previously transmitted cell-specific configured SFI. In some examples, the reservation indication transmitter 1515 may transmit a dynamic SFI via DCI, where the dynamic SFI is specific for an upcoming TTI or set of TTIs.

In some examples, the reservation indication transmitter 1515 may transmit, to the UE, a prioritized configuration that includes the indication of reserved TTIs that are reserved for UL or DL communications with the MCG, as well as an indication of which of the additional TTIs are to be used for UL or DL communications with the MCG. In some cases, the indication further indicates DL TTIs, unknown TTIs, or both which are reserved for communication with the MCG.

The additional TTI indicator 1520 may indicate to a SCG the reserved TTIs and also additional TTIs that are available for UL communication with either the MCG or the SCG. In some examples, the additional TTI indicator 1520 may transmit, to the UE, a joint configuration that includes the indication of reserved TTIs that are reserved for UL or DL communications with the MCG, as well as an indication of which of the additional TTIs are to be used for UL or DL communications with the MCG and which of the additional TTIs are to be used for UL or DL communications with the SCG.

The reserved TTI receiver 1525 may receive, from the UE, one or more UL messages using the reserved TTIs. The additional TTI identifier 1530 may transmit a schedule for using one or more of the additional TTIs for UL communication with either the MCG or the SCG, the schedule facilitating avoidance of simultaneous UL transmissions to both the MCG and the SCG. The time offset component 1535 may transmit, to the UE, a parameter that indicates a time offset for UL transmission of HARQ feedback after receipt of a data message, where the time offset is in terms of a number of reserved TTIs. In some examples, the time offset component 1535 may receive HARQ feedback in accordance with the parameter.

Figure 16:
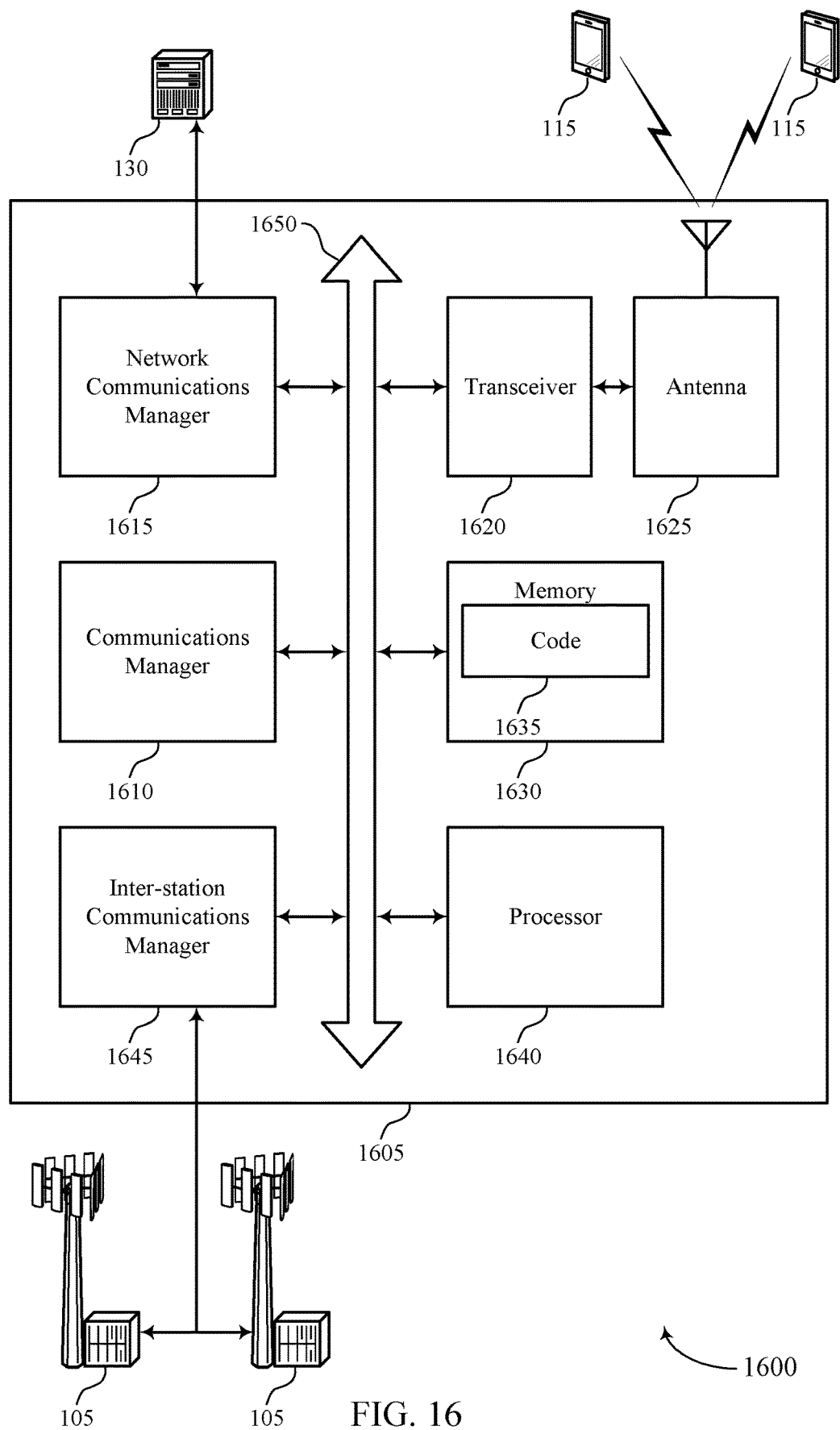
FIG. 16 shows a diagram of a system including a device that supports MCG and SCG coexistence in accordance with aspects of the present disclosure.

FIG. 16 shows a diagram of a system 1600 including a device 1605 that supports MCG and SCG coexistence in accordance with aspects of the present disclosure. The device 1605 may be an example of or include the components of device 1305, device 1405, or a base station 105 as described above, e.g., with reference to FIGS. 1, 13, and 14. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify that the base station is operating as a MCG in dual connectivity with a UE, transmit, to the UE, an indication of reserved TTIs that are reserved for priority UL communication with the MCG, indicate to a SCG the reserved TTIs and also additional TTIs that are available for UL communication with either the MCG or the SCG, and receive, from the UE, one or more UL messages using the reserved TTIs.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting MCG and SCG coexistence).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
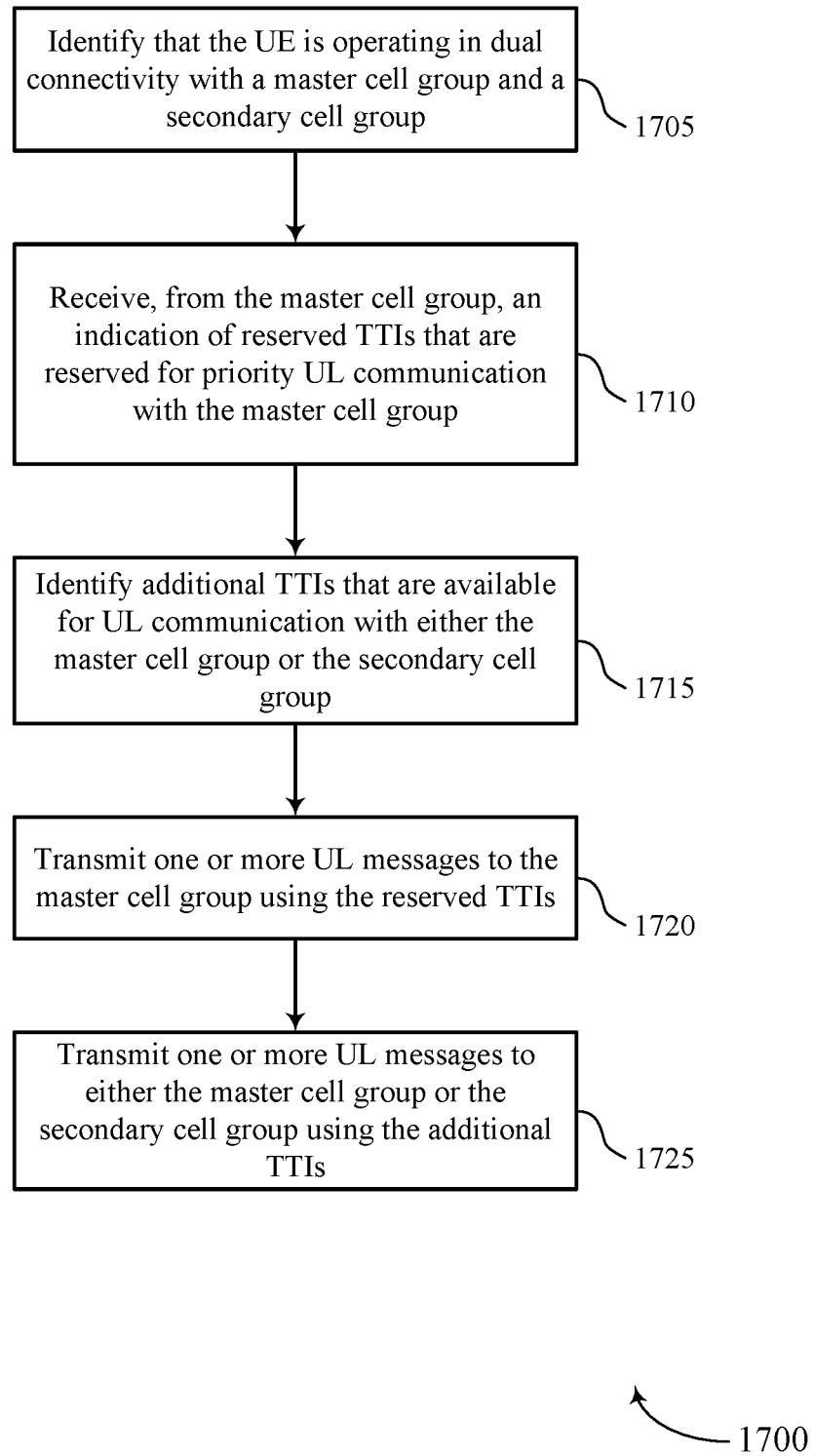
FIGS. 17 through 19 show flowcharts illustrating methods that support MCG and SCG coexistence in accordance with aspects of the present disclosure.

FIG. 17 shows a flowchart illustrating a method 1700 that supports MCG and SCG coexistence in accordance with aspects of the present disclosure. The operations of method 1700 may be implemented by a UE 115 or its components as described herein. For example, the operations of method 1700 may be performed by a communications manager as described with reference to FIGS. 9 to 12. In some examples, a UE may execute a set of instructions to control the functional elements of the UE to perform the functions described below. Additionally, or alternatively, a UE may perform aspects of the functions described below using special-purpose hardware.

At 1705, the UE 115 may identify that the UE 115 is operating in dual connectivity with a MCG and a SCG. The operations of 1705 may be performed according to the methods described herein. In some examples, aspects of the operations of 1705 may be performed by a dual connectivity identifier as described with reference to FIGS. 9 to 12.

At 1710, the UE 115 may receive, from the MCG, an indication of reserved TTIs that are reserved for priority UL communication with the MCG. The operations of 1710 may be performed according to the methods described herein. In some examples, aspects of the operations of 1710 may be performed by a TTI reservation component as described with reference to FIGS. 9 to 12.

At 1715, the UE 115 may identify additional TTIs that are available for UL communication with either the MCG or the SCG. The operations of 1715 may be performed according to the methods described herein. In some examples, aspects of the operations of 1715 may be performed by an additional TTI identifier as described with reference to FIGS. 9 to 12.

At 1720, the UE 115 may transmit one or more UL messages to the MCG using the reserved TTIs. The operations of 1720 may be performed according to the methods described herein. In some examples, aspects of the operations of 1720 may be performed by a reserved TTI transmitting component as described with reference to FIGS. 9 to 12.

At 1725, the UE 115 may transmit one or more UL messages to either the MCG or the SCG using the additional TTIs. The operations of 1725 may be performed according to the methods described herein. In some examples, aspects of the operations of 1725 may be performed by an additional TTI transmitting component as described with reference to FIGS. 9 to 12.

Figure 18:
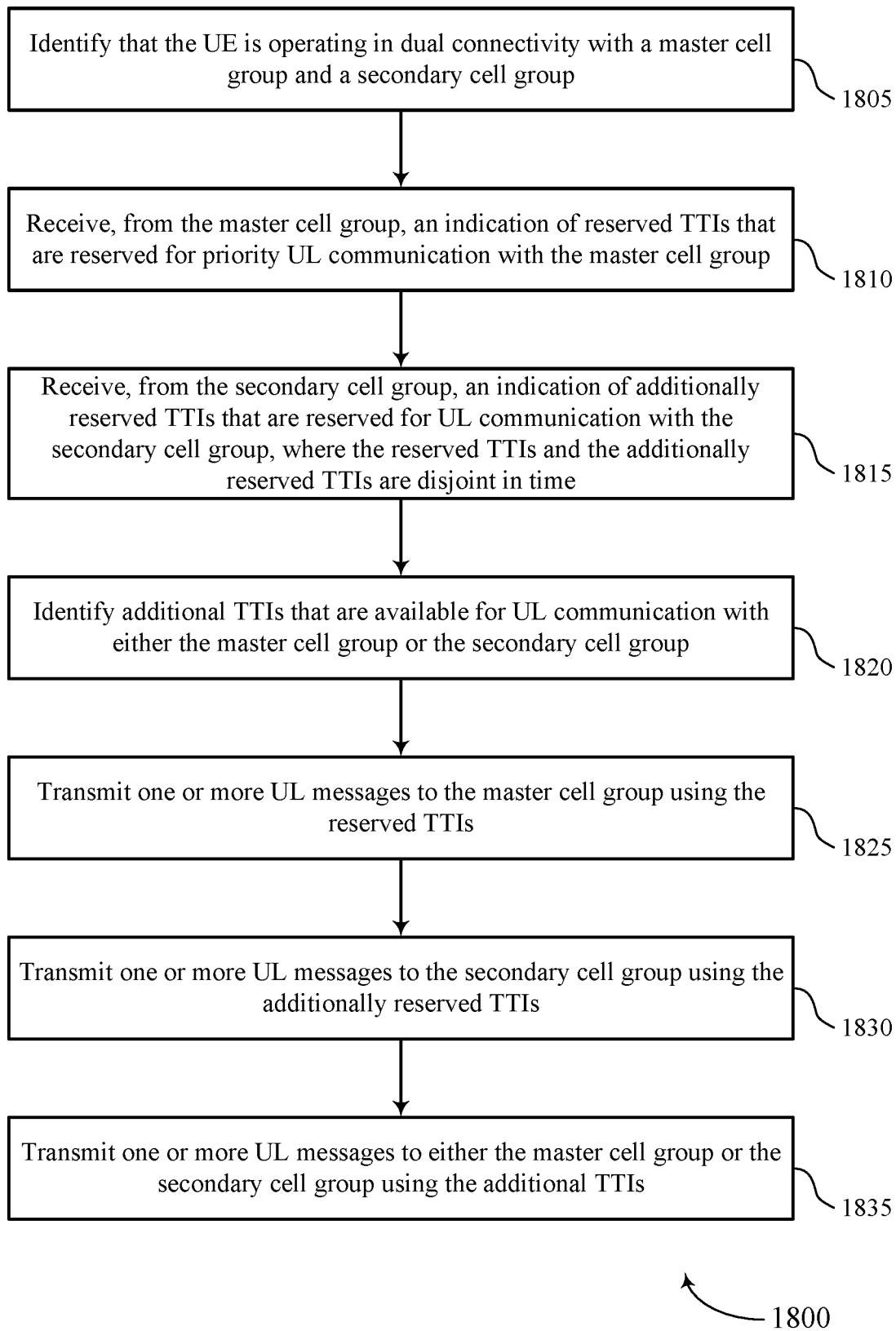

FIG. 18 shows a flowchart illustrating a method 1800 that supports MCG and SCG coexistence in accordance with aspects of the present disclosure. The operations of method 1800 may be implemented by a UE 115 or its components as described herein. For example, the operations of method 1800 may be performed by a communications manager as described with reference to FIGS. 9 to 12. In some examples, a UE may execute a set of instructions to control the functional elements of the UE to perform the functions described below. Additionally, or alternatively, a UE may perform aspects of the functions described below using special-purpose hardware.

At 1805, the UE 115 may identify that the UE 115 is operating in dual connectivity with a MCG and a SCG. The operations of 1805 may be performed according to the methods described herein. In some examples, aspects of the operations of 1805 may be performed by a dual connectivity identifier as described with reference to FIGS. 9 to 12.

At 1810, the UE 115 may receive, from the MCG, an indication of reserved TTIs that are reserved for priority UL communication with the MCG. The operations of 1810 may be performed according to the methods described herein. In some examples, aspects of the operations of 1810 may be performed by a TTI reservation component as described with reference to FIGS. 9 to 12.

At 1815, the UE 115 may receive, from the SCG, an indication of additionally reserved TTIs that are reserved for UL communication with the SCG, where the reserved TTIs and the additionally reserved TTIs are disjoint in time. The operations of 1815 may be performed according to the methods described herein. In some examples, aspects of the operations of 1815 may be performed by a TTI reservation component as described with reference to FIGS. 9 to 12.

At 1820, the UE 115 may identify additional TTIs that are available for UL communication with either the MCG or the SCG. The operations of 1820 may be performed according to the methods described herein. In some examples, aspects of the operations of 1820 may be performed by an additional TTI identifier as described with reference to FIGS. 9 to 12.

At 1825, the UE 115 may transmit one or more UL messages to the MCG using the reserved TTIs. The operations of 1825 may be performed according to the methods described herein. In some examples, aspects of the operations of 1825 may be performed by a reserved TTI transmitting component as described with reference to FIGS. 9 to 12.

At 1830, the UE 115 may transmit one or more UL messages to the SCG using the additionally reserved TTIs. The operations of 1830 may be performed according to the methods described herein. In some examples, aspects of the operations of 1830 may be performed by an additional TTI transmitting component as described with reference to FIGS. 9 to 12.

At 1835, the UE 115 may transmit one or more UL messages to either the MCG or the SCG using the additional TTIs. The operations of 1835 may be performed according to the methods described herein. In some examples, aspects of the operations of 1835 may be performed by an additional TTI transmitting component as described with reference to FIGS. 9 to 12.

Figure 19:
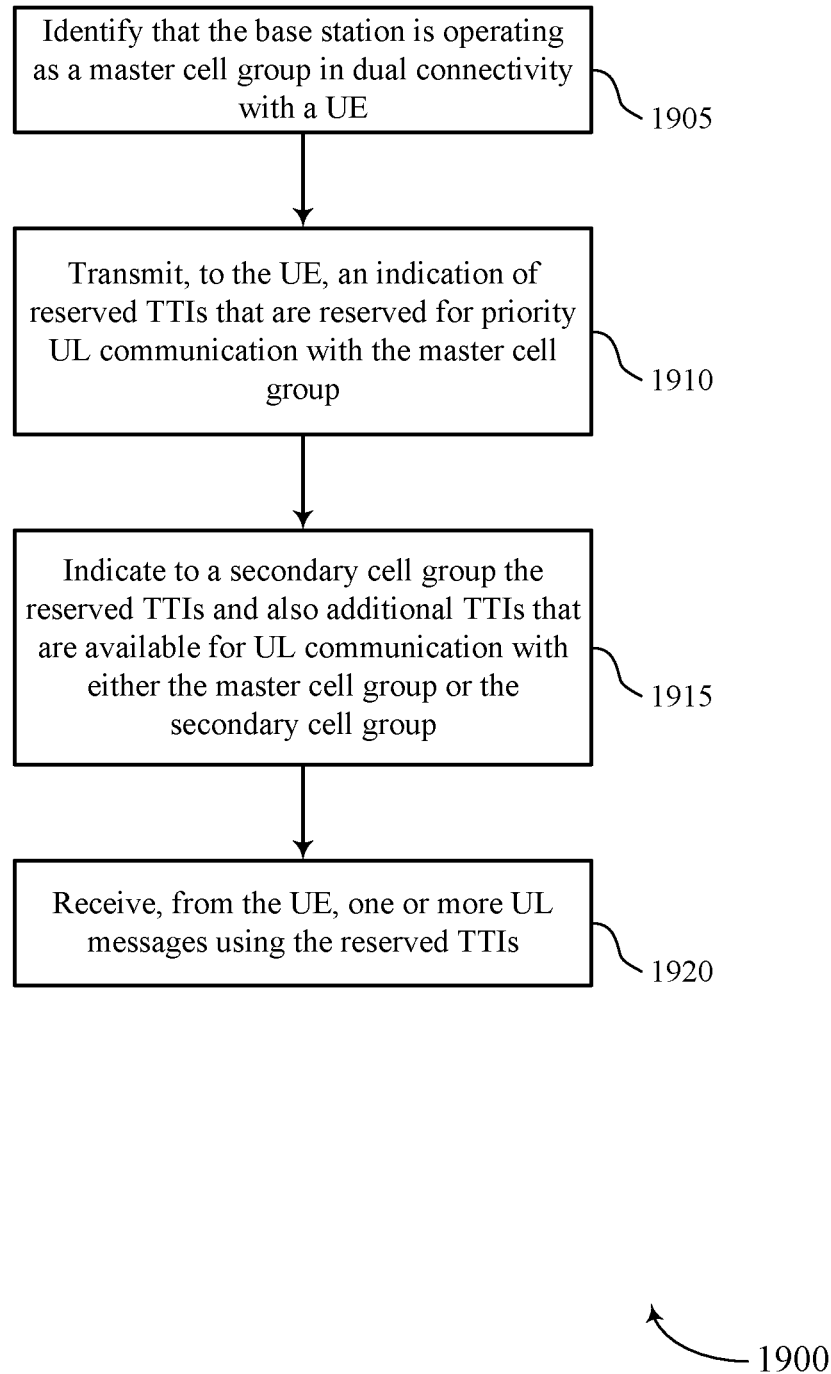

FIG. 19 shows a flowchart illustrating a method 1900 that supports MCG and SCG coexistence in accordance with aspects of the present disclosure. The operations of method 1900 may be implemented by a base station 105 or its components as described herein. In some cases, the base station 105 may be an example of a gNB 202, 302, or 702 as described herein, especially with reference to FIGS. 2, 3, and 7. In some other examples, the base station 105 may be an example of an eNB 204, 304, and 704 as described herein, especially with reference to FIGS. 2, 3, and 7. For example, the operations of method 1900 may be performed by a communications manager as described with reference to FIGS. 13 to 16. In some examples, a base station may execute a set of instructions to control the functional elements of the base station to perform the functions described below. Additionally, or alternatively, a base station may perform aspects of the functions described below using special-purpose hardware.

At 1905, the base station 105 may identify that the base station is operating as a MCG in dual connectivity with a UE 115. The operations of 1905 may be performed according to the methods described herein. In some examples, aspects of the operations of 1905 may be performed by a dual connectivity identifier as described with reference to FIGS. 13 to 16.

At 1910, the base station 105 may transmit, to the UE 115, an indication of reserved TTIs that are reserved for priority UL communication with the MCG. The operations of 1910 may be performed according to the methods described herein. In some examples, aspects of the operations of 1910 may be performed by a reservation indication transmitter as described with reference to FIGS. 13 to 16.

At 1915, the base station 105 may indicate to a SCG the reserved TTIs and also additional TTIs that are available for UL communication with either the MCG or the SCG. The operations of 1915 may be performed according to the methods described herein. In some examples, aspects of the operations of 1915 may be performed by an additional TTI indicator as described with reference to FIGS. 13 to 16.

At 1920, the base station 105 may receive, from the UE 115, one or more UL messages using the reserved TTIs. The operations of 1920 may be performed according to the methods described herein. In some examples, aspects of the operations of 1920 may be performed by a reserved TTI receiver as described with reference to FIGS. 13 to 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is operating in dual connectivity with a master cell group and a secondary cell group;
    receiving, from the master cell group, an indication of reserved transmission time intervals (TTIs) that are reserved for priority uplink (UL) communication with the master cell group;
    identifying additional TTIs that are available for UL communication with either the master cell group or the secondary cell group;
    transmitting a first set of one or more UL messages to the master cell group using the reserved TTIs; and
    transmitting a second set of one or more UL messages to either the master cell group or the secondary cell group using the additional TTIs.

2. The method of claim 1, further comprising:
    receiving a schedule for using one or more of the additional TTIs for UL communication with either the master cell group or the secondary cell group, the schedule facilitating avoidance of simultaneous UL transmissions to both the master cell group and the secondary cell group, wherein transmitting the second set of one or more UL messages using the additional TTIs is in accordance with the schedule.

3. The method of claim 1, further comprising:
receiving, from the secondary cell group, an indication of additionally reserved TTIs that are reserved for UL communication with the secondary cell group, wherein the reserved TTIs and the additionally reserved TTIs are disjoint in time; and
transmitting a third set of one or more UL messages to the secondary cell group using the additionally reserved TTIs.

4. The method of claim 1, further comprising:
determining that a first UL message to the master cell group and a second UL message to the secondary cell group are both scheduled for a same TTI of the additional TTIs;
identifying a priority between the first UL message to the master cell group and the second UL message to the secondary cell group; and
transmitting one of the first UL message to the master cell group or the second UL message to the secondary cell group during the TTI based on the priority.

5. The method of claim 1, wherein receiving the indication of reserved TTIs comprises:
receiving a slot format indication (SFI) that identifies a configuration for UL TTIs, downlink (DL) TTIs, unknown TTIs, or combinations of the same, wherein the reserved TTIs include the UL TTIs.

6. The method of claim 1, wherein the indication further indicates downlink (DL) TTIs, unknown TTIs, or both which are reserved for communication with the master cell group.

7. The method of claim 1, wherein the master cell group is configured for time-division duplex (TDD) operation and the secondary cell group is configured for frequency-division duplex (FDD) operation, with UL transmissions to the secondary cell group being time-shared with supplemental uplink (SUL) transmissions to the master cell group.

8. The method of claim 1, further comprising:
identifying an FDD timing configuration for UL transmissions to the secondary cell group, the FDD timing configuration facilitating avoidance of simultaneous UL transmissions to both the master cell group and the secondary cell group, wherein transmitting the second set of one or more UL messages using the additional TTIs is in accordance with the FDD timing configuration.

9. The method of claim 1, further comprising:
receiving a joint configuration that includes the indication of reserved TTIs that are reserved for UL or downlink (DL) communications with the master cell group, as well as an indication of which of the additional TTIs are to be used for UL or DL communications with the master cell group and which of the additional TTIs are to be used for UL or DL communications with the secondary cell group.

10. The method of claim 1, further comprising:
receiving a prioritized configuration that includes the indication of reserved TTIs that are reserved for UL or downlink (DL) communications with the master cell group, as well as an indication of which of the additional TTIs are to be used for UL or DL communications with the master cell group.

11. The method of claim 10, wherein transmitting the second set of one or more UL messages to either the master cell group or the secondary cell group using the additional TTIs comprises:
transmitting the second set of one or more UL messages to the secondary cell group during one of the additional TTIs indicated as being for DL communications with the master cell group.

12. The method of claim 1, wherein transmitting the second set of one or more UL messages to either the master cell group or the secondary cell group using the additional TTIs comprises:
transmitting first UL messages to the master cell group and second UL messages to the secondary cell group during a same TTI.

13. The method of claim 12, further comprising:
prioritizing power control for each of the first and second UL messages transmitted during the same TTI based at least in part on a type of each of the first and second UL messages.

14. The method of claim 12, further comprising:
prioritizing power control for each of the first and second UL messages transmitted during the same TTI based at least in part on a start time for each of the first and second UL messages.

15. The method of claim 12, wherein a first maximum power control for the first UL messages transmitted to the master cell group and a second maximum power control for the second UL messages transmitted to the secondary cell group during the same TTI are each less than respective power controls for UL transmissions during different TTIs.

16. The method of claim 1, further comprising:
identifying a first TTI duration associated with the master cell group;
identifying a second TTI duration associated with the secondary cell group; and
applying a transmission power control scheme based at least in part on the first TTI duration and the second TTI duration.

17. The method of claim 16, wherein applying the transmission power control scheme further comprises:
adjusting a transmission power for the UL messages transmitted to the master cell group and the UL messages transmitted to the secondary cell group after a TTI of the first TTI duration based at least in part on the first TTI duration being longer than the second TTI duration.

18. The method of claim 16, wherein applying the transmission power control scheme further comprises:
adjusting a transmission power for the UL messages transmitted to the master cell group and the UL messages transmitted to the secondary cell group after a TTI of the second TTI duration based at least in part on the second TTI duration being longer than the first TTI duration.

19. A method for wireless communication at a base station, comprising:
identifying that the base station is operating as a master cell group in dual connectivity with a user equipment (UE);
transmitting, to the UE, an indication of reserved transmission time intervals (TTIs) that are reserved for priority uplink (UL) communication with the master cell group;
indicating to a secondary cell group the reserved TTIs and also additional TTIs that are available for UL communication with either the master cell group or the secondary cell group; and
receiving, from the UE, one or more UL messages using the reserved TTIs.

20. The method of claim 19, further comprising:
transmitting a schedule for using one or more of the additional TTIs for UL communication with either the master cell group or the secondary cell group, the schedule facilitating avoidance of simultaneous UL transmissions to both the master cell group and the secondary cell group.

21. The method of claim 19, wherein transmitting the indication of reserved TTIs comprises:
transmitting a slot format indication (SFI) that identifies a configuration for UL TTIs, downlink (DL) TTIs, unknown TTIs, or combinations of the same, wherein the reserved TTIs include the UL TTIs.

22. The method of claim 19, wherein the indication further indicates downlink (DL) TTIs, unknown TTIs, or both which are reserved for communication with the master cell group.

23. The method of claim 19, wherein the master cell group is configured for time-division duplex (TDD) operation and the secondary cell group is configured for frequency-division duplex (FDD) operation, with UL transmissions to the secondary cell group being time-shared with supplemental uplink (SUL) transmissions to the master cell group.

24. The method of claim 19, further comprising:
indicating, to the UE, an FDD timing configuration for UL transmissions to the secondary cell group, the FDD timing configuration facilitating avoidance of simultaneous UL transmissions to both the master cell group and the secondary cell group.

25. The method of claim 19, further comprising:
transmitting, to the UE, a joint configuration that includes the indication of reserved TTIs that are reserved for UL or downlink (DL) communications with the master cell group, as well as an indication of which of the additional TTIs are to be used for UL or DL communications with the master cell group and which of the additional TTIs are to be used for UL or DL communications with the secondary cell group.

26. The method of claim 19, further comprising:
transmitting, to the UE, a prioritized configuration that includes the indication of reserved TTIs that are reserved for UL or downlink (DL) communications with the master cell group, as well as an indication of which of the additional TTIs are to be used for UL or DL communications with the master cell group.

27. An apparatus for wireless communication at a user equipment (UE), comprising: a processor, memory coupled with the processor; and instructions stored in the memory and executable by the processor to cause the apparatus to:
identify that the UE is operating in dual connectivity with a master cell group and a secondary cell group;
receive, from the master cell group, an indication of reserved transmission time intervals (TTIs) that are reserved for priority uplink (UL) communication with the master cell group;
identify additional TTIs that are available for UL communication with either the master cell group or the secondary cell group;
transmit a first set of one or more UL messages to the master cell group using the reserved TTIs; and
transmit a second set of one or more UL messages to either the master cell group or the secondary cell group using the additional TTIs.

28. The apparatus of claim 27, wherein the instructions are further executable by the processor to cause the apparatus to:
receive a schedule for using one or more of the additional TTIs for UL communication with either the master cell group or the secondary cell group, the schedule facilitating avoidance of simultaneous UL transmissions to both the master cell group and the secondary cell group, wherein transmitting the second set of one or more UL messages using the additional TTIs is in accordance with the schedule.

29. An apparatus for wireless communication at a base station, comprising: a processor, memory coupled with the processor; and instructions stored in the memory and executable by the processor to cause the apparatus to:
identify that the base station is operating as a master cell group in dual connectivity with a user equipment (UE);
transmit, to the UE, an indication of reserved transmission time intervals (TTIs) that are reserved for priority uplink (UL) communication with the master cell group;
indicate to a secondary cell group the reserved TTIs and also additional TTIs that are available for UL communication with either the master cell group or the secondary cell group; and
receive, from the UE, one or more UL messages using the reserved TTIs.

30. The apparatus of claim 29, wherein the instructions are further executable by the processor to cause the apparatus to:
transmit a schedule for using one or more of the additional TTIs for UL communication with either the master cell group or the secondary cell group, the schedule facilitating avoidance of simultaneous UL transmissions to both the master cell group and the secondary cell group.

* * * * *